(12) United States Patent
Amoss et al.

(10) Patent No.: US 8,118,534 B2
(45) Date of Patent: Feb. 21, 2012

(54) CONTAINER CARGO TRANSFER SYSTEM

(75) Inventors: Robert S. Amoss, New Orleans, LA (US); Matthew Amoss, New Orleans, LA (US)

(73) Assignee: Amoss Trading Services, Inc., New Orleans, LA (US)

( * ) Notice: Subject to any disclaimer, the term of this patent is extended or adjusted under 35 U.S.C. 154(b) by 0 days.

(21) Appl. No.: 12/794,225

(22) Filed: Jun. 4, 2010

(65) Prior Publication Data
US 2011/0135424 A1    Jun. 9, 2011

Related U.S. Application Data

(63) Continuation of application No. 12/015,915, filed on Jan. 17, 2008, now abandoned, which is a continuation of application No. 10/617,366, filed on Jul. 10, 2003, now abandoned, which is a continuation-in-part of application No. 09/735,343, filed on Feb. 11, 2000, now abandoned, and a continuation-in-part of application No. 10/016,169, filed on Nov. 30, 2001, now abandoned.

(51) Int. Cl.
*B63B 27/00* (2006.01)

(52) U.S. Cl. .................. 414/803; 414/139.9; 414/140.1; 414/141.3; 212/316

(58) Field of Classification Search .................. 114/265; 212/224, 233, 307, 310, 311, 312, 317, 318, 212/324–327; 414/137.7, 137.8, 137.9, 138.1, 414/138.2, 138.5, 138.6, 138.7, 138.8, 139.9, 414/140.1, 140.2, 140.3, 140.4, 141.3, 141.4, 414/141.6, 141.7, 142.8, 138.9, 142.6, 142.7
See application file for complete search history.

(56) References Cited

U.S. PATENT DOCUMENTS

| | | | | |
|---|---|---|---|---|
| 2,793,766 A * | 5/1957 | Fetchko | ...................... | 414/141.7 |
| 3,649,047 A * | 3/1972 | Plantan | ...................... | 280/425.1 |
| 4,111,451 A * | 9/1978 | Pinto | .............................. | 280/408 |
| 4,112,863 A * | 9/1978 | Nelson | ........................... | 114/264 |
| 5,951,226 A * | 9/1999 | Fantuzzi | ..................... | 414/141.3 |
| 2002/0071743 A1* | 6/2002 | Amoss, Jr. | ................. | 414/137.9 |
| 2002/0100740 A1* | 8/2002 | Amoss | ......................... | 212/224 |
| 2004/0126205 A1* | 7/2004 | Amoss et al. | .............. | 414/138.5 |
| 2008/0112779 A1* | 5/2008 | Amoss et al. | .............. | 414/137.9 |

FOREIGN PATENT DOCUMENTS

| | | | |
|---|---|---|---|
| EP | 2161229 A1 * | 3/2010 |
| JP | 57057132 A * | 4/1982 |
| JP | 57077132 A * | 5/1982 |
| JP | 2001260981 A * | 9/2001 |

* cited by examiner

*Primary Examiner* — Gregory Adams
(74) *Attorney, Agent, or Firm* — Garvey, Smith, Nehrbass & North, L.L.C.; Seth M. Nehrbass; Vanessa M. D'Souza

(57) ABSTRACT

A platform container transfer terminal (10) functions as an efficient hub port. Sea Point™ Transfer station modules (21, 22, 23) can be moved intact across oceans for rapid erection in remote or strategic locations to provide high speed loading and unloading of large container vessels (31, 32) to lighters or feeder vessels (41, 42, 43, 44, 45) and/or to facilities adjacent. A gantry crane (510) combined with one or more rotating boom cranes (11, 12, 17, 18) increases cargo productivity economically. There can be two luffing boom cranes attached to the gantry and two slewing boom cranes attached to the gantry. One can retrofit an existing gantry by attaching a boom crane and frame to a ship-to-shore gantry.

7 Claims, 19 Drawing Sheets

CONTAINER CARGO TRANSFER SYSTEM

CROSS-REFERENCE TO RELATED APPLICATIONS

This is a continuation of U.S. patent application Ser. No. 12/015,915, filed 17 Jan. 2008 now abandoned, which is a continuation of U.S. patent application Ser. No. 10/617,366, filed 10 Jul. 2003, now abandoned, which is a continuation-in-part of U.S. patent application Ser. No. 09/735,343, filed Dec. 11, 2000, now abandoned, and of U.S. patent application Ser. No. 10/016,169, filed 30 Nov. 2001, now abandoned.

U.S. Provisional Patent Application Ser. No. 60/170,270, filed 11 Dec. 1999, is incorporated herein by reference.

U.S. patent application Ser. No. 09/735,343, filed Dec. 11, 2000, is incorporated herein by reference, as is the published version of that patent application.

International Patent Application No. PCT/US00/33568, filed Dec. 11, 2000, is incorporated herein by reference, as is the published version (Int. Pub. No. WO 01/42125) of that patent application.

U.S. patent application Ser. No. 10/016,169, filed 30 Nov. 2001, is incorporated herein by reference, as is the published version of that patent application.

International Patent Application No. PCT/US01/48090, filed 30 Nov. 2001, is incorporated herein by reference, as is the published version (Int. Pub. No. WO 02/044073) of that patent application.

U.S. Provisional Patent Application Ser. No. 60/310,593, filed 7 Aug. 2001, is incorporated herein by reference.

U.S. Provisional Patent Application Ser. No. 60/270,334, filed 21 Feb. 2001, is incorporated herein by reference.

U.S. Provisional Patent Application Ser. No. 60/250,053, filed 30 Nov. 2000, is incorporated herein by reference.

U.S. Provisional Patent Application Ser. No. 60/394,988, filed 10 Jul. 2002, is incorporated herein by reference.

Priority of these patent applications is hereby claimed and they are all incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cargo transfer systems. More particularly, the present invention relates to systems for transferring cargo between ocean-going vessels and land destinations or ocean-going vessels and barges or between ocean-going vessels, barges, and landside terminals, and including direct transfer from barges to rail without storing the goods landside.

2. General Background of the Invention

At present large container vessels provide economies of scale by carrying very large numbers of intermodal containers and container derivative devices such as flat racks and open tops containers. Such large ships today carry more than 6000 twenty foot equivalent units (TEU) and still larger ocean-going vessels are foreseen. The containers carried by these large vessels are generated by several regional ports spread geographically over areas such as South East Asia, UK/North Europe or a US coastal region. This requires the large vessel to either make multiple port calls, some times once to discharge and later to double back to load, or by using a port in the region as a hub port where the large vessel proceeds to a landside terminal, from which containers are both landed for local distribution and transsshipped to feeder vessels or barges and/or to trucks or rail cars, for distribution to other port destinations. The terminal operation required at landside hub ports is extensive and costly involving trucking from quay to storage in stacks and load out in a reverse operation at later dates to on carrying vessels.

Typically, import containers discharged from a large carrier vessel at a landside terminal are hauled from the dock side to stacked storage on the back side of the terminal or placed on wheeled chassis and parked for later haul back to cranes for loading to feeder vessels or to rail cars at distant sidings or transferred to trucks for delivery to other ports or inland locations.

Outbound containers are received at a landside terminal from rail sidings, often at remote locations or from drays and long haul trucks or feeder vessels and assembled on the backside of the terminal awaiting the arrival and readiness of the large carrier to load. Hundreds of acres of land are required for such operations in addition to the several handling operations involved.

The critical matter of road and rail infrastructure required for landside terminals to accommodate large vessels can take decades to develop and billions of dollars in cost. Environmental issues may also intervene. In Vietnam, a jack-up causeway was used to unload containers from ships. The causeway was used as a dock where trucks took the containers as they were unloaded and hauled away.

The Freeport Sulphur mine is a series of jack-up barges strung together.

Cranes for transferring containers from ships include gantry cranes and boom cranes.

The following patents documents are incorporated herein by reference:

U.S. Pat. Nos. 969,164; 1,193,587; 1,237,573; 1,346,068; 1,547,536; 2,308,743; 3,149,733; 3,183,676; 3,290,007; 3,367,119; 3,586,152; 3,606,251; 3,750,210; 3,945,450; 3,958,106; 3,967,457; 4,310,277; 4,363,411; 4,417,664; 4,456,404; 4,465,012; 4,482,272; 4,505,616; 4,544,137; 4,547,857; 4,568,232; 4,589,799; 4,627,768; 4,632,622; 4,652,177; 4,666,341; 4,678,165; 4,722,640; 4,762,456; 4,813,814; 4,916,999; 5,028,194; 5,139,366; 5,224,798; 5,456,560; 5,478,181; 5,515,982; 5,580,189; 5,733,092; 5,797,703; 5,807,029; DE 455 495; DE 1 079 299; DE 25 43 156; FR 588,542; GB 17,349; and all patent documents mentioned herein.

U.S. Pat. No. 4,762,456 discloses a cargo container loading and unloading operation where a floating crane is used to transfer containers between deep draft ships and shallow draft ships.

U.S. Pat. No. 4,363,411 (see col. 3, lines 44-53) discloses a loading/unloading crane system that is placed between the ocean and a lagoon to handle deep draft and shallow draft ships at the same time.

U.S. Pat. No. 4,465,012 discloses a floating crane transshipment device to accommodate movement of cargo between ships and barges.

U.S. Pat. No. 4,568,232 discloses a floating horizontal boom bulk unloader that allows shallow draft ships to be loaded and unloaded from a deep draft ship.

U.S. Pat. Nos. 4,310,277; 4,457,85; 4,544,137; 4,632,622; and 5,028,194 disclose cargo transfer systems supported on open sea platforms with one or more cranes.

BRIEF SUMMARY OF THE INVENTION

The apparatus of the present invention comprises a platform container transfer terminal that functions as an efficient hub port. Sea Point™ Terminal modules can be constructed to move intact across oceans for rapid erection in remote or strategic locations to provide high speed loading and unloading of large container vessels to lighters or feeder vessels and/or to/and facilities adjacent.

One embodiment of the present invention includes a container offloading facility made of jack-up barges. There can be, for example, four jack-up barges, each barge from 100 feet (30.5 m) to 700 feet (213.4 m) (e.g., 450 feet (137.2 m)) long and 25 feet (7.62 m) to 250 feet (76.2 m) (e.g., 100 feet (30.5 m)) wide, in an ocean-going hull design, with e.g. a 20 foot (6.1 m) hull depth, and placed end-to-end to provide a platform (e.g. 1800 feet (548.6 m) long). There can be multiple (for example, 4) cranes per platform. The facility could advantageously be placed at the mouth of a river (such as at the mouth of the Mississippi River) to provide a sea coast or near sea coast transfer port for large vessels.

The container cranes used with the facility of the present invention can include a boom on the backside which is much longer than a conventional backside boom on a land terminal. This facilitates loading the feeder vessels or barges while at the same time offloading the ocean-going container or cargo ships (and vice versa).

The present invention also comprises a method of transporting goods, comprising using a jack-up barge to transfer goods from an ocean-going vessel to a barge or other shallower-draft feeder vessel.

The present invention also comprises a method of transporting goods, comprising using a pile-supported platform deck on which cranes operate to transfer goods from an ocean-going vessel to a barge or other type feeder vessels.

The present invention can be constructed as a floating mobile terminal or as a fixed terminal on pile or material foundation. The Sea Point™ platform concept consists of a platform structure erected in a semi-sheltered location such as at the mouth of a river, bay, sound or inlet with sufficient water depth, natural or dredged, to accommodate ocean-going vessels on one side and feeder vessels or barges on the opposite side. The platform may be constructed on pilings in the manner of a pile-supported dock, as an artificial island built up of material, or as floating modules with spud legs which can be towed intact to remote transoceanic locations and combined for rapid jack-up assembly as one platform made from multiple modules at the chosen site. Floating modules with jack-up supporting legs that can be embedded in the solid bottom material allows almost immediate erection of the platform to its desired height ready to accommodate container transfers between large carriers on one side and feeder vessels or barges on the opposite side. Towable jack-up platform modules are particularly attractive for military rapid deployment needs and could be a valuable element of U.S. prepositioned forces or reserve fleet components.

The platform (FIG. 1) serves as the base for container handling cranes one version of which has been designed to have an extreme reach on the large vessel side as well as on the feeder side so that even a postpanamax vessel (over 105 feet (32 m) wide) up to 200 feet (61 m) wide can be loaded or discharged by the container crane boom on the large vessel side to or from barges or feeders docked two or more (e.g., four) wide up to +200 feet (61 m) off the feeder vessel side. These container cranes using state-of-the-art hoisting speed at lifting capacity and with high horizontal travel speeds can, in one transfer cycle, lift two or more loaded containers at a time and rapidly transfer them to or from stowed positions on the feeders. Feeder vessels or barges being shorter and less wide and deep than large container carriers can be berthed on the platform side opposite the larger vessels in multiple sets (FIG. 2) so that distribution to multiple destinations can be served quickly by loading some feeders with specifically destined containers and dispersing them immediately upon completion of discharge. Simultaneously, outbound cargo would be brought to Sea Point™ by separate feeder vessels or barges and placed along side the platform feeder side to be transferred to the large vessel as soon as the loaded feeders are taken away from the dock.

During loading or discharge at a Sea Point™ transfer platform, outport destined containers may be landed to transfer cars stationed under the crane legs on designated road ways that may run in opposite directions in order to distribute such containers to other cranes serving feeders for their destinations (FIGS. 3 and 4). This would be accomplished by vehicles (for example, light tractors) hauling these containers (e.g., on cars or chassis) to those cranes loading the desired feeders, reducing the necessity for stacking or grounding containers on the platform during cargo operations. The container crane can also be designed to have two separate cabs with traveling trolleys that move outward from a center raised platform located between the legs of the crane; this provides rapid transfer from each side that will speed up the loading and discharge cycles substantially (FIGS. 3 and 4).

A pile-supported platform or a platform on a built-up material (spoil or otherwise) island can be used as the foundation for the transfer platform of the present invention, which in cases where mobility is of no value, would be a cheaper mode of construction.

Other configurations of transfer cranes have certain advantages where alternative container cells on the large vessels and/or the feeder vessels are served by special crane arrangements as shown, for example, in FIGS. 5-8.

The delivery to various Port terminals by feeder barges or feeder vessels permits each port terminal to be designed to discharge the less costly unmanned vessel units, direct to rail car and truck lanes located along the dockside within the reach of port cranes' terminal side. Extended landside booms on port cranes can accomplish this efficiently and provide added opportunity by placing containers directly on stacks in the terminal yard saving costly terminal handlings and reducing significantly the acreage required for each container terminal. The Sea Point™ platform can also be placed so as to provide offloading from large vessels to feeders and to adjacent terminal docks by locating the platform in water at a distance of about 100 feet (30.5 m) from the land terminal thus allowing one or more (e.g., two) feeder vessels to be berthed between the Sea Point™ platform and land terminal. The long (e.g., 200 foot (61 m)) reach of the crane's booms on each side of the platform would allow transfers between the land terminal, feeder vessels and the large vessel as desired.

The critical matter of road and rail infrastructure required for landside terminals to accommodate large vessels can take decades to develop and billions of dollars in cost. Environmental issues may also intervene. In contrast a Sea Point™ transfer platform can be fabricated for erection in appropriate water depth locations in less than two years time and its size is unlimited. Ideally, Sea Point™ platforms can also be phased in to provide an initial length and width to handle, for instance, the next half decade of expected use and then expanded to any greater length or width when required.

The present invention comprises a method of transporting goods, comprising:
providing a jack-up barge;
providing a crane on the jack-up barge;
transferring goods from an ocean-going vessel to a barge or other shallower-draft feeder vessel using the crane on the jack-up barge. Preferably, the jack-up barge is positioned at the mouth of a river.

The present invention also comprises a system for transshipping containerized cargo, comprising:
a jack-up barge;
a crane on the jack-up barge for transferring goods from an ocean-going vessel to a barge or other shallower-draft feeder vessel using the crane on the jack-up barge.

The present invention further comprises a system for transshipping containerized cargo, comprising:
a plurality of jack-up barges connected together end-to-end to form a transshipping platform;
cranes on the jack-up barges for transferring goods from ocean-going vessels to barges or other shallower-draft feeder vessels using the cranes on the jack-up barges. Preferably, the jack-up barges are each about 450 feet (137.2 m) long and about 100 feet (30.5 m) wide, with about a 20 foot (6.1 m) hull depth and an ocean-going hull design. Preferably, there are at least four cranes. Preferably, there is also an upper transfer platform above the transshipping platform. Preferably, there are also cargo transfer roadways on the transshipping platform.

The platform is preferably at least 100-200 feet (30.5-61 m) long, more preferably at least 300 feet (91.4 m) long, even more preferably at least 400 feet (121.9 m) long, and most preferably at least 500 feet (152.4 m) long; the platform is preferably 20-1000 feet (6.1 m-305 m) wide, more preferably 40-500 feet (12.2 m-152.4 m) wide, and most preferably 60-200 feet (18.3-61 m) wide.

The present invention also comprises a gantry having one or more boom cranes.

The ability for a port to enhance all of its cargo vessel operations and particularly feeder and rail-on-dock operations by fitting existing or new ship-to-shore gantries with a boom crane is the primary benefit of the invention. The attached cranes can be considered a movable accessory thereby allowing the terminal operator to change the configuration of the gantry to optimize his cranes for different cargo operations, including containers, bulk, palletized and break bulk cargo.

The gantries of the present invention with boom cranes attached thereto have utility, for example, in terminals operating as transfer hubs for water-borne vessels, working from the transfer rack and the barges or small feeder ships on the back side of the platform or pier and larger ships on the ship side of the platform or pier.

A preferred embodiment of the present invention is apparatus including a gantry, a gantry crane attached to the gantry, and at least one rotating boom crane attached to the gantry. There can be at least two rotating boom cranes attached to the gantry. There is preferably at least one boom crane attached to the ship side of the gantry. There can be at least one boom crane attached to the back side of the gantry.

In one embodiment of the invention, there are three rotating boom cranes attached to the gantry. In one embodiment of the invention, there are four rotating boom cranes attached to the gantry. At least one of the boom cranes can be a rotating horizontal slewing boom crane The gantry can be a ship-to-shore gantry. A boom crane and frame can be attached to the ship-to-shore gantry.

The apparatus of the present invention can include a boom crane, a frame for supporting the boom crane, and means for attaching the frame to a ship-to-shore gantry.

The boom crane in any embodiment could be a slewing boom crane attached to the gantry, or a luffing boom crane attached to the gantry.

In some embodiments, there can be at least one luffing boom crane attached to the gantry and at least one slewing boom crane attached to the gantry. In other embodiments, there can be two luffing boom cranes attached to the gantry and two slewing boom cranes attached to the gantry.

The apparatus of the present invention includes a platform container transfer terminal that functions as an efficient hub port.

More information about the invention can be found in the papers attached to U.S. Provisional Patent Application No. 60/394,988, filed 10 Jul. 2002.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

For a further understanding of the nature, objects, and advantages of the present invention, reference should be had to the following detailed description, read in conjunction with the following drawings, wherein like reference numerals denote like elements and wherein.

Figure 1:
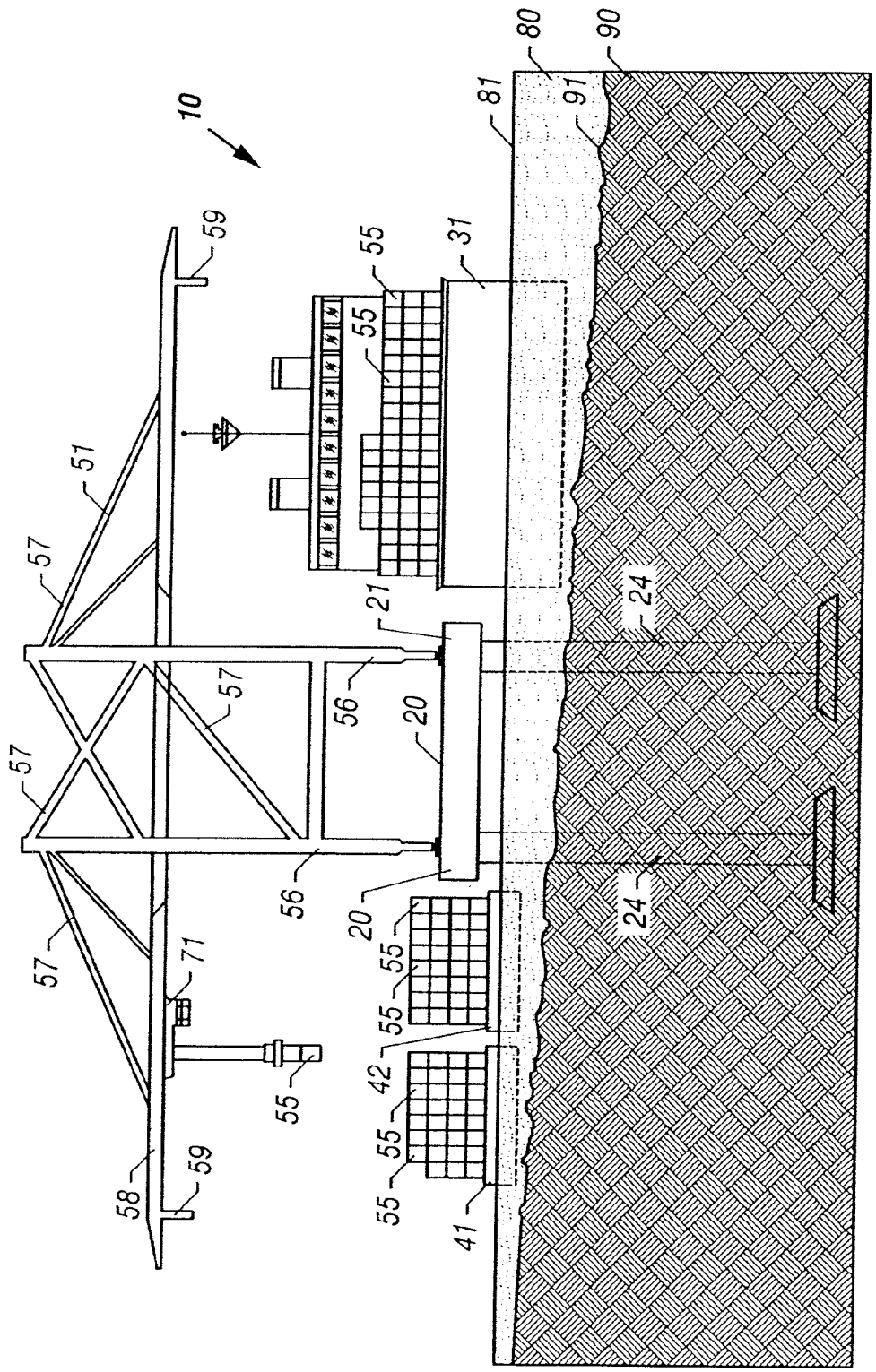
FIG. 1 is a side view of a first embodiment of the apparatus of the present invention.

drawings of some embodiments of the present invention are shown in the papers (incorporated herein by reference) attached to U.S. Provisional Patent Application No. 60/394,988, filed 10 Jul. 2002.

DETAILED DESCRIPTION OF THE INVENTION

The Sea Point™ platform apparatus 10 (FIGS. 1 and 2) of the first embodiment of the present invention comprises a platform structure 20 erected in a semi-sheltered location such as at the mouth of a river, bay, sound or inlet with sufficient water depth, natural or dredged, to accommodate ocean going vessels 31, 32 on one side and feeder vessels or barges 41, 42, 43, 44, 45 on the opposite side. For example, the platform apparatus of the present invention can be installed in the Mississippi River near Venice, La., US, adjacent the West bank at mile 12.2 above head of passes.

Platform apparatus 10 (FIGS. 1 and 2) is similar to platform apparatus 100 (FIGS. 3 and 4) but lacks upper transfer platform 65 and the double trolley system of platform apparatus 100. Both platform apparatus 10 and platform apparatus 100 include a helicopter pad (heliport) 75 at one end thereof.

The platform 20 may be constructed on pilings in the manner of a pile-supported dock or as modules 21, 22, 23 with spud legs 24 which can be towed, floating, intact to remote transoceanic locations for rapid jack-up assembly as one terminal made from multiple modules 21, 22, 23 at the chosen site. Floating modules 21, 22, 23 with jack-up supporting legs 24 that can be embedded in the solid bottom material allow almost immediate erection of the platform 20 to its desired height ready to accommodate container transfers between large carriers 31, 32 on one side and feeder vessels or barges 41, 42, 43, 44, 45 on the opposite side. Towable jack-up platform modules 21, 22, 23 are particularly attractive for military rapid deployment needs and could be a valuable element of U.S. prepositioned forces or reserve fleet components. As shown in the drawings, the platform 20 is set out an appropriate height above the water line 81 of water 80, with spud legs 24 extending below the mud line 91 and through mud 90.

The platform 20 (FIG. 1) serves as the base for container handling cranes 51, 52, 53, 54 that can be designed to have an extreme reach on the large vessel side as well as on the feeder side so that a panamax vessel 31 105 feet (32 m) wide, or a postpanamax vessel 32 up to 200 feet (61 m) wide can be loaded or discharged by the container boom on the large vessel side to or from feeders 41, 42, 43, 44, 45 docked two or more wide up to about 200 feet (61 m) off the feeder vessel side. These container cranes 51, 52, 53, 54 using state of the art lifting speed and capacity and horizontal travel speeds can, in one transfer cycle, lift two or more loaded containers 55 at a time and rapidly transfer them to or from stowed positions on the feeders. Cranes 51, 52, 53, 54 can be similar to standard gantry container handling cranes, and similar in construction to the cranes shown in U.S. Pat. Nos. 4,363,411; 4,568,232; and 4,762,456. Cranes 51, 52, 53, 54 each include crane legs 56, gantries 58 supported on legs 56, bracing 57 which interconnects legs 56 and which connects legs 56 to gantries 58, and trolley stops 59 to prevent the trolleys 71 from falling off of the ends of the gantries 58.

Feeder vessels or barges 41, 42, 43, 44, 45 being shorter and less wide than large container carriers 31, 32 can be berthed on the platform side opposite the larger vessels 31, 32 in sets (FIG. 2) so that distribution to multiple destinations can be served quickly by loading the feeders with specifically destined containers and dispersing immediately upon completion of discharge. Simultaneously, outbound cargo would be brought to Sea Point™ by separate feeder vessels or barges 41, 42, 43, 44, 45 and placed alongside the platform to be transferred to the large vessels 31, 32 as soon as the empty feeder is taken away from the dock. It is also possible to use one vessel/barge as a carrier for export and import transferred containers.

Figure 3:
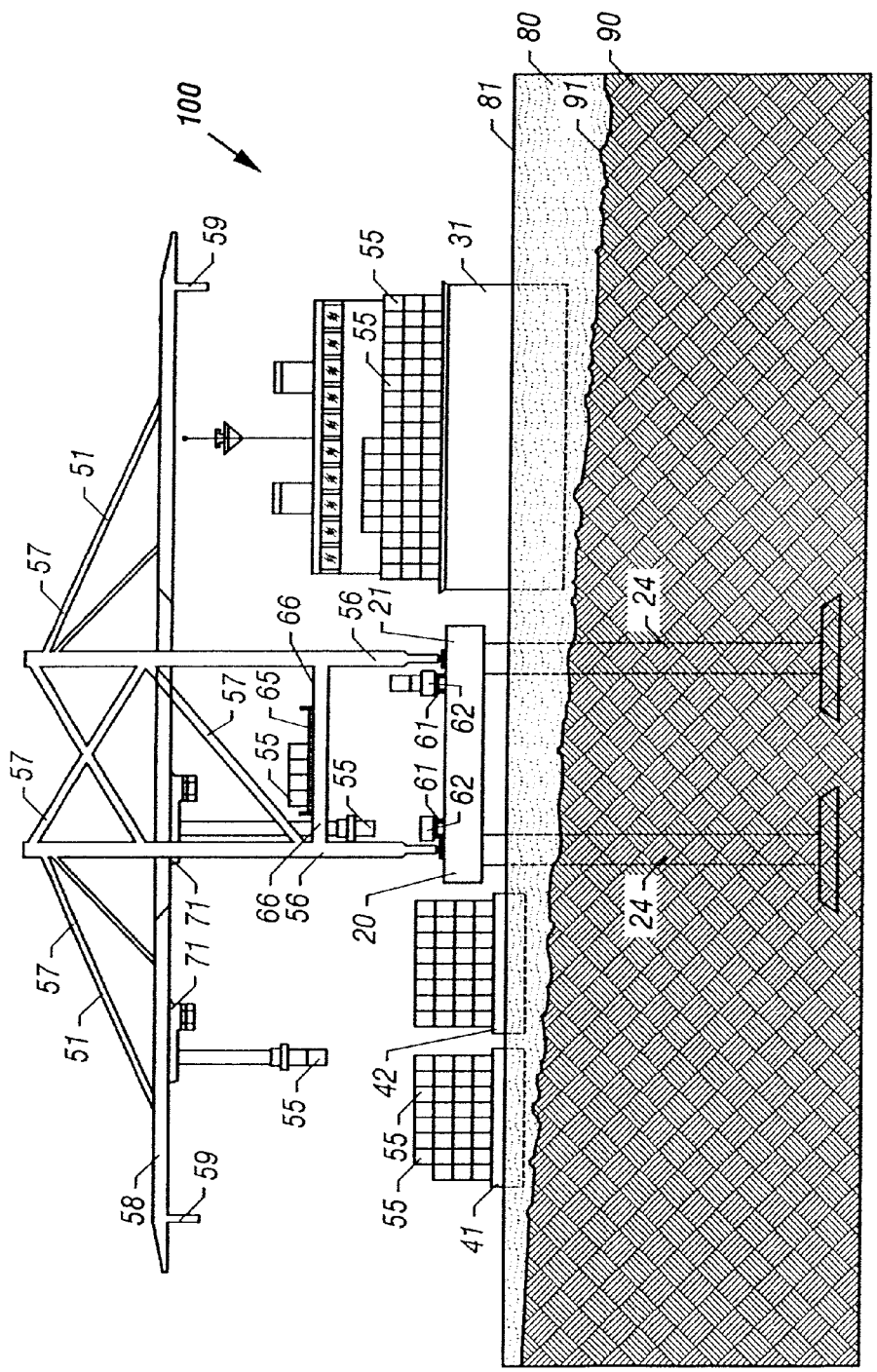
FIG. 3 is a side view of a second embodiment of the apparatus of the present invention.
Figure 4:
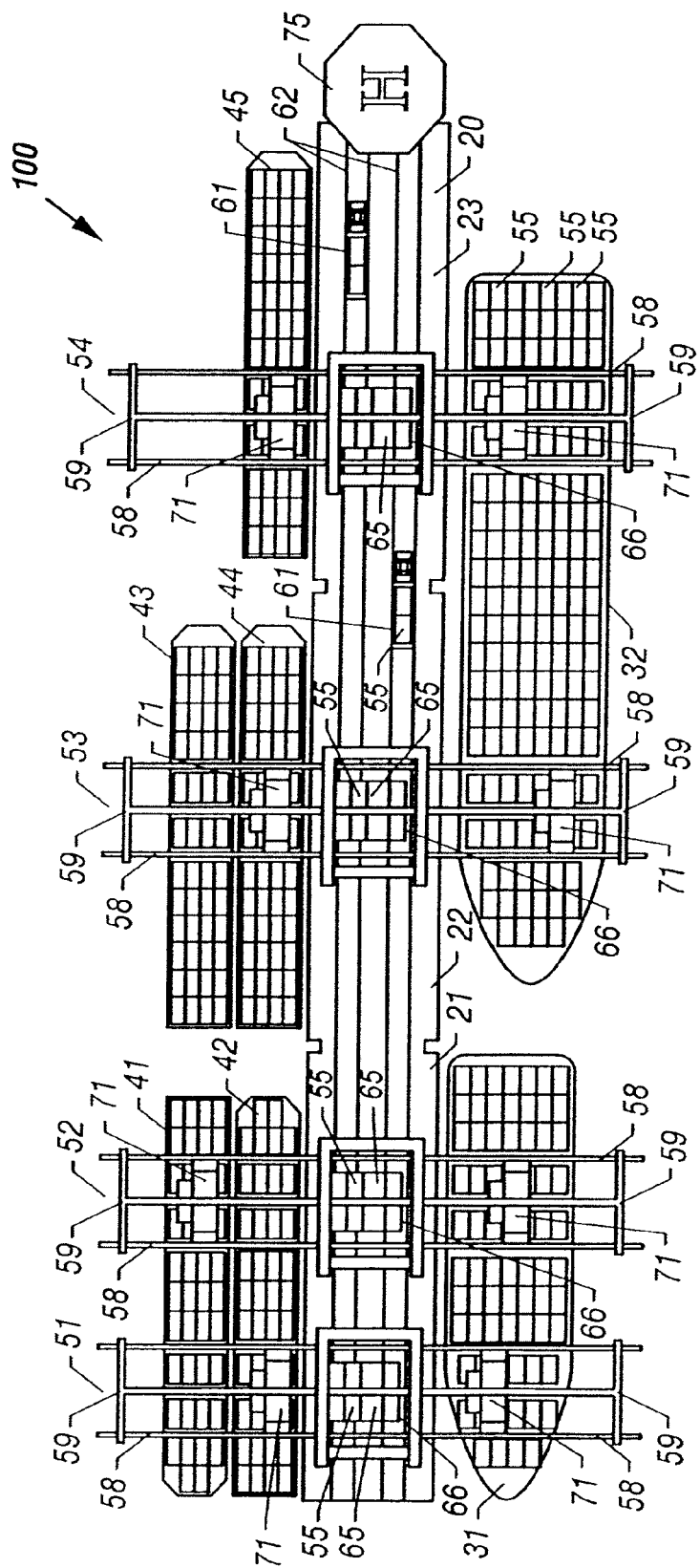
FIG. 4 is a top view of the second embodiment of the apparatus of the present invention.

During loading or discharge at a Sea Point™ transfer platform, outport destined containers 55 may be landed to one or more transfer cars 61 stationed under the crane legs 56 on designated road ways 62 that may run in opposite directions so as to distribute such containers 55 to cranes serving feeders for their destinations (FIG. 3). This would be accomplished by vehicles (such as light tractors 76—see FIG. 7) hauling these containers on cars or chassis 61 to cranes loading the desired feeders, reducing or eliminating any necessity for stacking or grounding containers on the platform during cargo operations. The container cranes 51, 52, 53, 54 can also be designed to each have two separate cabs and traveling trolleys 71 that move outward from a center raised transfer rack 65; this provides rapid transfer from each side that will speed up the loading and discharge cycles substantially (see FIG. 3). As shown in FIG. 3, containers 55 can rest on transfer rack 65 while waiting to be transferred between ships 31, 32, and barges 41, 42, 43, 44, or 45. Adjacent transfer rack 65 are openings 66 to allow containers 55 to move from the cranes 51, 52, 53, 54 to road ways 62.

The delivery to various port terminals by feeder barges or feeder vessels 41, 42, 43, 44, 45 permits each port terminal to be designed to discharge these less costly vessel units 41, 42, 43, 44, 45, direct to rail car and truck lanes located along the dockside within the reach of port cranes' terminal side. Extended landside booms on port cranes can accomplish this efficiently and provide added opportunity that save several costly terminal handlings and reduces significantly the acreage traditionally required for each container terminal. The Sea Point™ platform apparatus can also be placed so as to provide offloading from large vessels to feeders and to adjacent terminal docks by locating the platform in water at a distance of about 100 feet (30.5 m) from the land terminal thus allowing one feeder vessel to be berthed between the Sea Point™ platform and land terminal. The reach (e.g. 200 feet-61 m) of the crane on each side of the platform would allow transfers between the land terminal, feeder vessels and the large vessel as desired.

Figure 5:
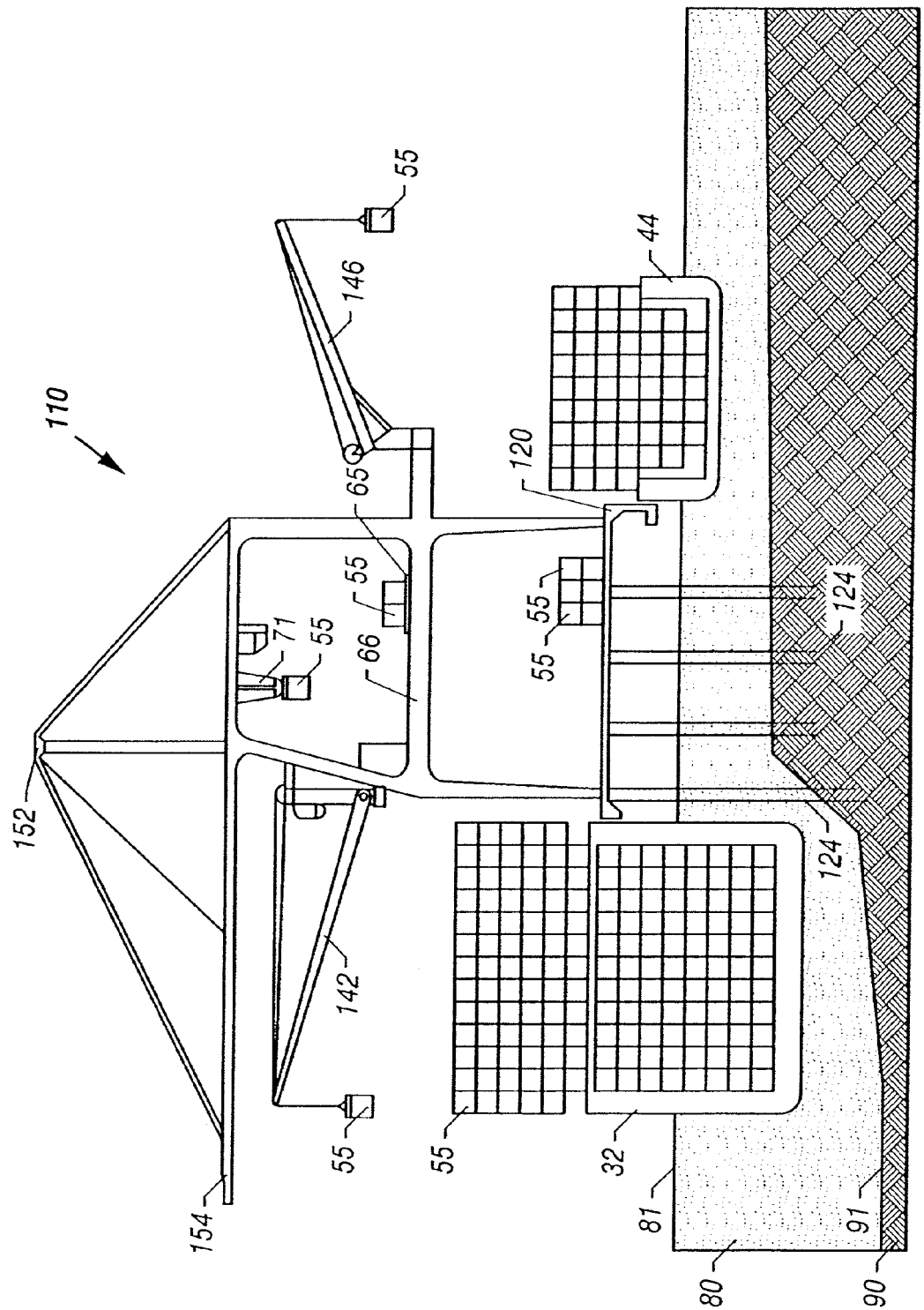
FIG. 5 is a side view of a third embodiment of the apparatus of the present invention.
Figure 6:
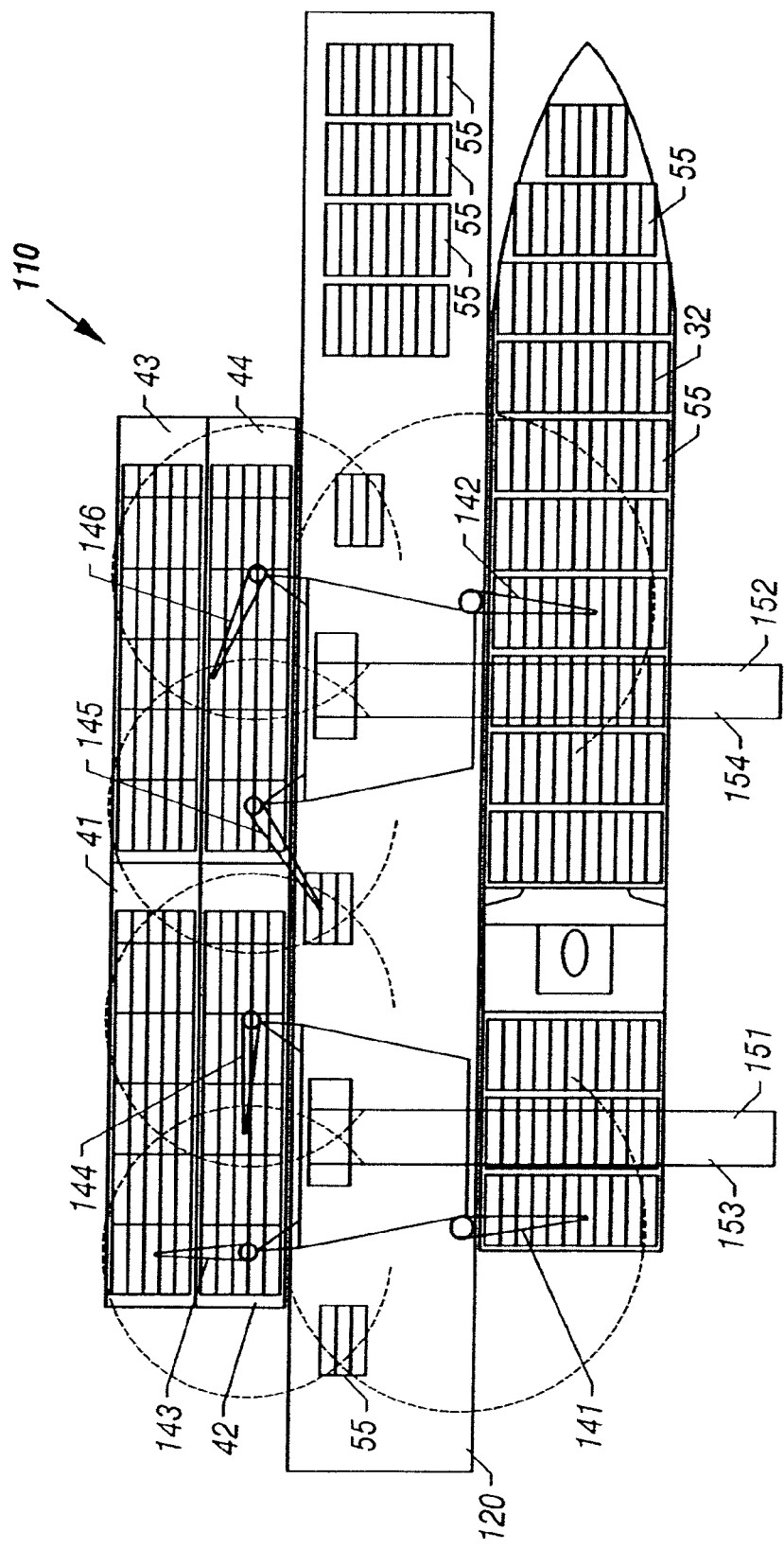
FIG. 6 is a top view of the third embodiment of the apparatus of the present invention.

The platform apparatus 110 of the third embodiment of the present invention is shown in FIGS. 5 and 6. Apparatus 110 includes a platform 120 supported by piles 124 imbedded in mud 90. Two container handling gantry cranes 151 and 152 are shown in FIG. 6. Crane 151 includes a gantry 153, a boom crane 141 with lifting hoist, and pedestal type boom cranes 143 and 144 with lifting hoists. Crane 152 includes a gantry 154, a boom crane 142 with lifting hoist, and pedestal type boom cranes 145 and 146 with lifting hoists.

The circles in FIG. 6 show the reach of the various cranes. As can be seen in FIG. 6, there are two storage stacks of containers 55 out of reach of the cranes (these containers 55 can be moved around by light tractors 76—see FIG. 7), and various stacks of containers 55 are shown which can be reached by more than one crane. In FIG. 6, the barges 41, 42, 433, and 44 can be partially unloaded onto platform 120 before ship 32 arrives to minimize dock time of ship 32.

Figure 7:
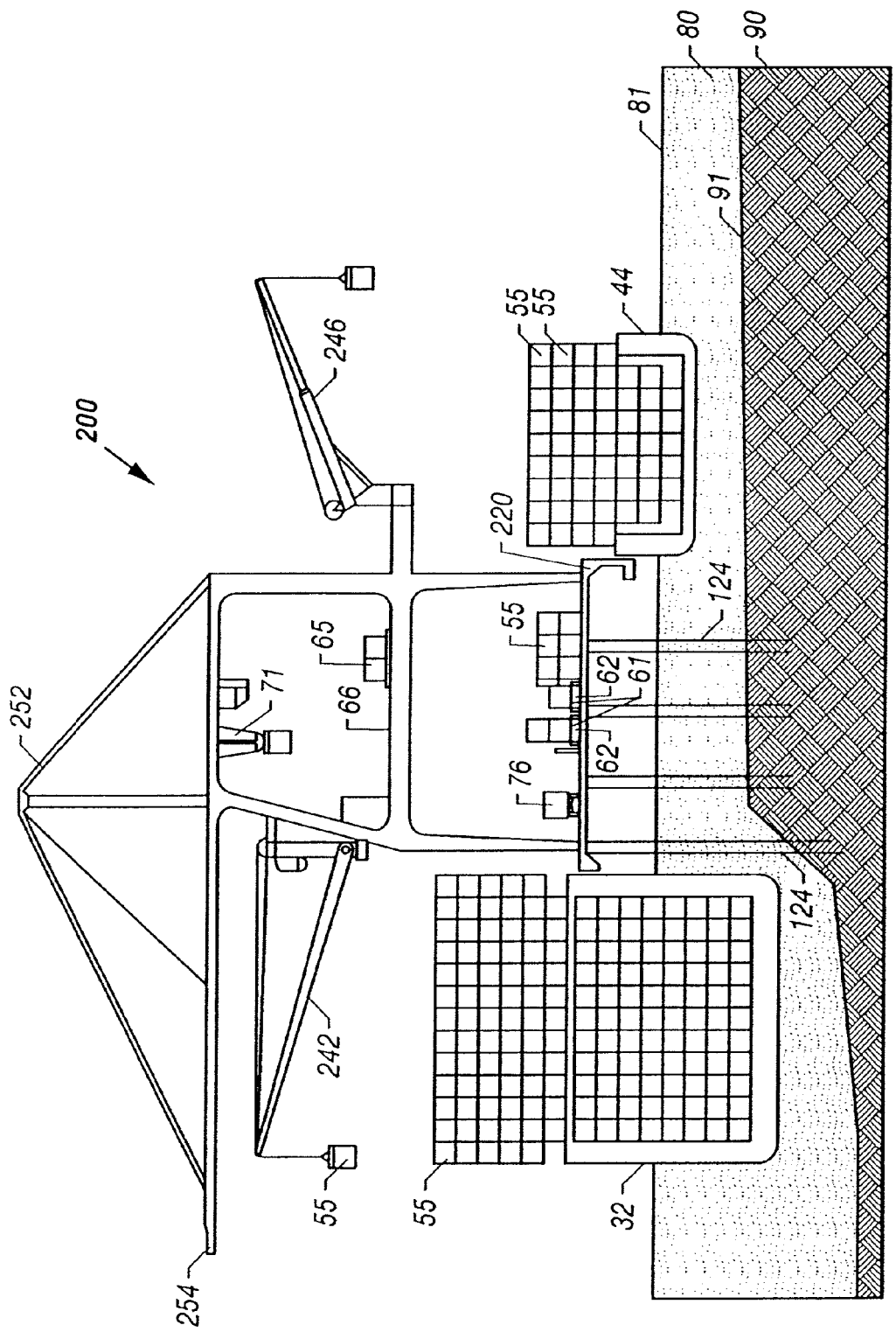
FIG. 7 is a side view of a fourth embodiment of the apparatus of the present invention.
Figure 8:
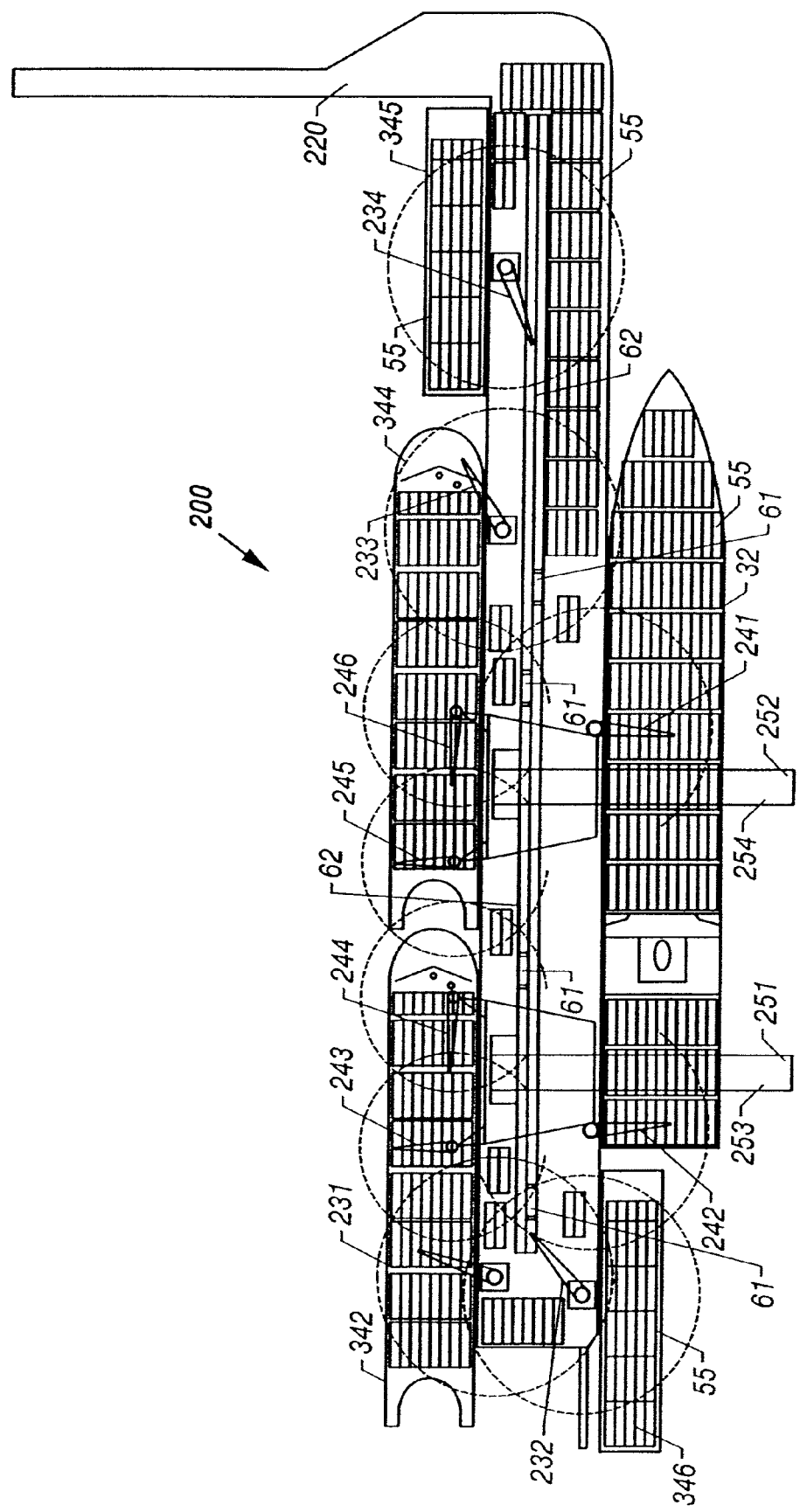
FIG. 8 is a top view of the fourth embodiment of the apparatus of the present invention.

The platform apparatus 200 of the fourth embodiment of the present invention is shown in FIGS. 7 and 8. Apparatus 200 includes a platform 220 on which are mounted two container handling gantry cranes 251 and 252. Crane 251 includes a gantry 253, a boom crane 241 with lifting hoist, and telescopic boom cranes 243 and 244 with lifting hoists. Crane 252 includes a gantry 254, a boom crane 242 with lifting hoist, and telescopic boom cranes 245 and 246 with lifting hoists.

The circles in FIG. 8 show the reach of the various cranes. As can be seen in FIG. 8, there are four mobile harbor cranes 231, 232, 233, and 234. The containers 55 out of reach of the fixed cranes can be moved around by light tractors 76—see FIG. 7—or by the mobile harbor cranes 231, 232, 233, and 234. FIG. 8 shows a causeway 225 from platform 220 to shore (not shown). This causeway 225 allows platform 220 to be supplied from shore as well as by barge and ship.

The various cranes shown in FIG. 8, the light tractors 76, and cars 61 move containers 55 among ship 32, feeder vessels 342 and 344, and barges 345 and 346.

In FIG. 8, the barges 345 and 346 can be partially unloaded onto platform 220 before ship 32 arrives to have empty slots available for the ship containers to minimize dock time of ship 32.

In FIG. 8, the gantry trolleys 71 unload above-hatch containers until the first hatch is cleared. Hatch covers are removed and cargo containers are unloaded to the bottom of the cell. Once a cell has been cleared, the cargo operations using trolleys to load and unload containers with each trolley move. The gantry trolleys 71 and the boom cranes 241 and 242 work the ship cargo. The gantry trolleys 71 deliver containers to the fixed container racks 65. The trolleys 71 may also land containers 55 on the shuttle cars 61 or on the platform 220 along the ship 32.

The cranes 243, 244, 245, 246 attached to the barge side of the gantries 253, 254 load from rack 65 to barges/feeder vessels 342, 344 and back. These cranes may also work to and from the dock transfer areas and the shuttles 61.

The boom cranes 241, 242 unload containers to the shuttle cars 61 or to the dock transfer areas.

The mobile harbor cranes 231, 232, 233, and 234 are set to work the barges 345 and 346 and feeder vessels 342 and 344 and stack.

All of the cranes are preferably equipped with anti-collision controls.

The critical matter of road and rail infrastructure required for landside terminals to accommodate large vessels can take decades to develop and billions of dollars in cost. Environmental issues may also intervene. In contrast a Sea Point™ transfer platform can be fabricated for erection in appropriate water depth locations in no more than two years time and size is unlimited. Ideally, Sea Point™ platforms can also be phased in to provide an initial size to handle, for instance, the next half decade of expected use and then expanded to any greater size when required.

Some embodiments of the present invention combine a gantry crane with one or more rotating boom cranes to increase cargo productivity economically.

The addition of one or two boom cranes to the ship side of the gantry allows a substantial increase in cargo productivity with a minimal cost.

Adding one or two boom cranes to the back side of a gantry will substantially increase the productivity of the gantry's ship unloading trolley. The increased reach of a boom allows terminal operators to efficiently load and unload barges, small feeder ships, trucks (terminal or road) and trains depending upon the terminal design.

Figure 9:
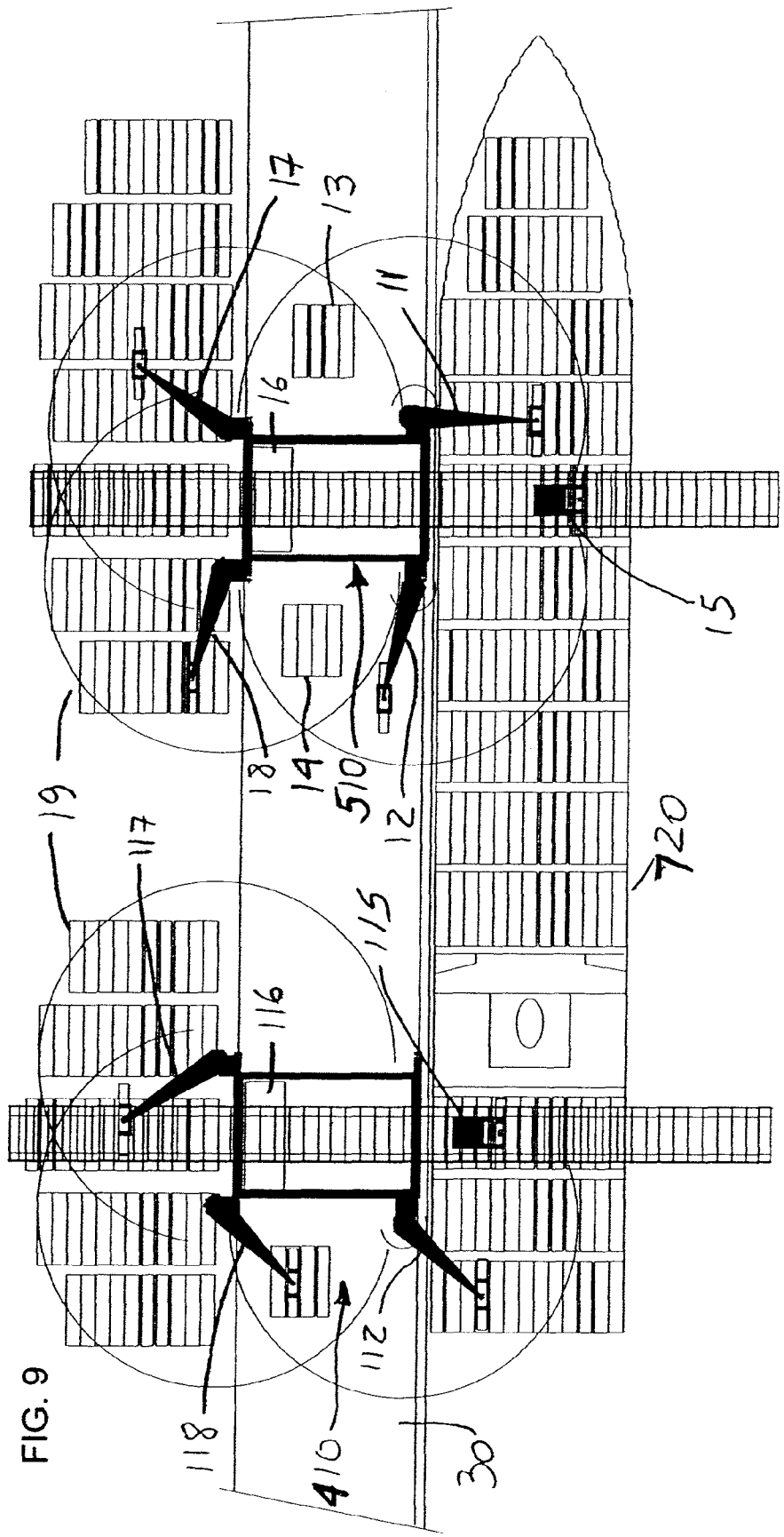
FIG. 9 is a plan view showing two gantries of the present invention.
Figure 10:
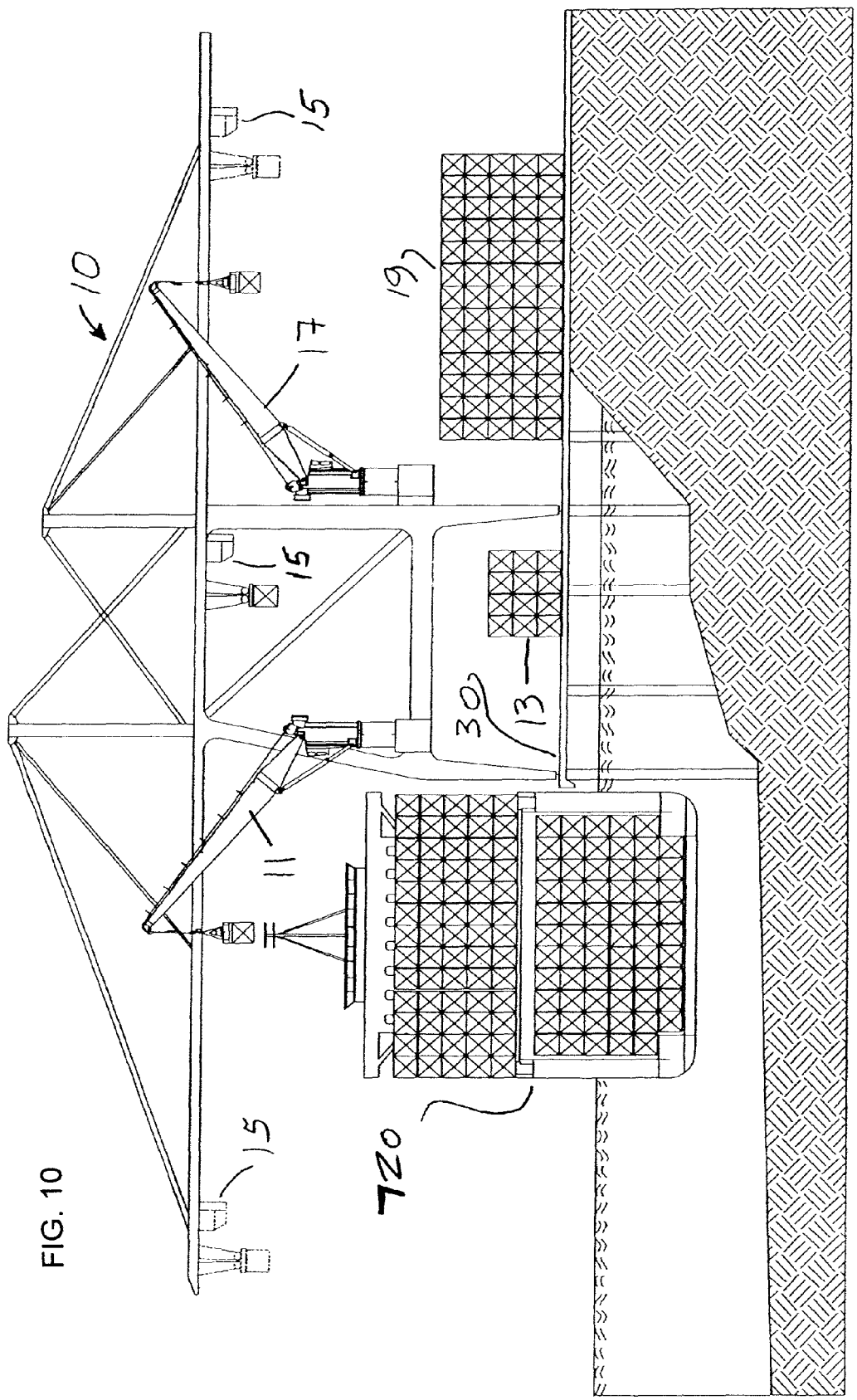
FIG. 10 is a side elevational view showing a gantry of FIG. 9.

FIGS. 9 and 10 show a container vessel 720 along a dock 30 with two gantry cranes 410 and 510. Gantry 510 has two ship side boom cranes 11 and 12 working to and from transfer areas 13 and 14. Trolley 15 of gantry 510 works to and from the ship 720 and transfer rack 16. Back boom cranes 17 and 18 of gantry 510 work between transfer rack 16 and the container storage stack 19. Back boom cranes 17 and 18 also work between transfer areas 13 and 14 and the container storage stack 19. Operations of gantry 410 are similar, though as shown gantry 410 has a single ship side boom crane 112. Like gantry 510, gantry 410 has two back boom cranes 117 and 118. Trolley 115 and cranes 112, 117, and 118 all work with a transfer rack 116.

Figure 11:
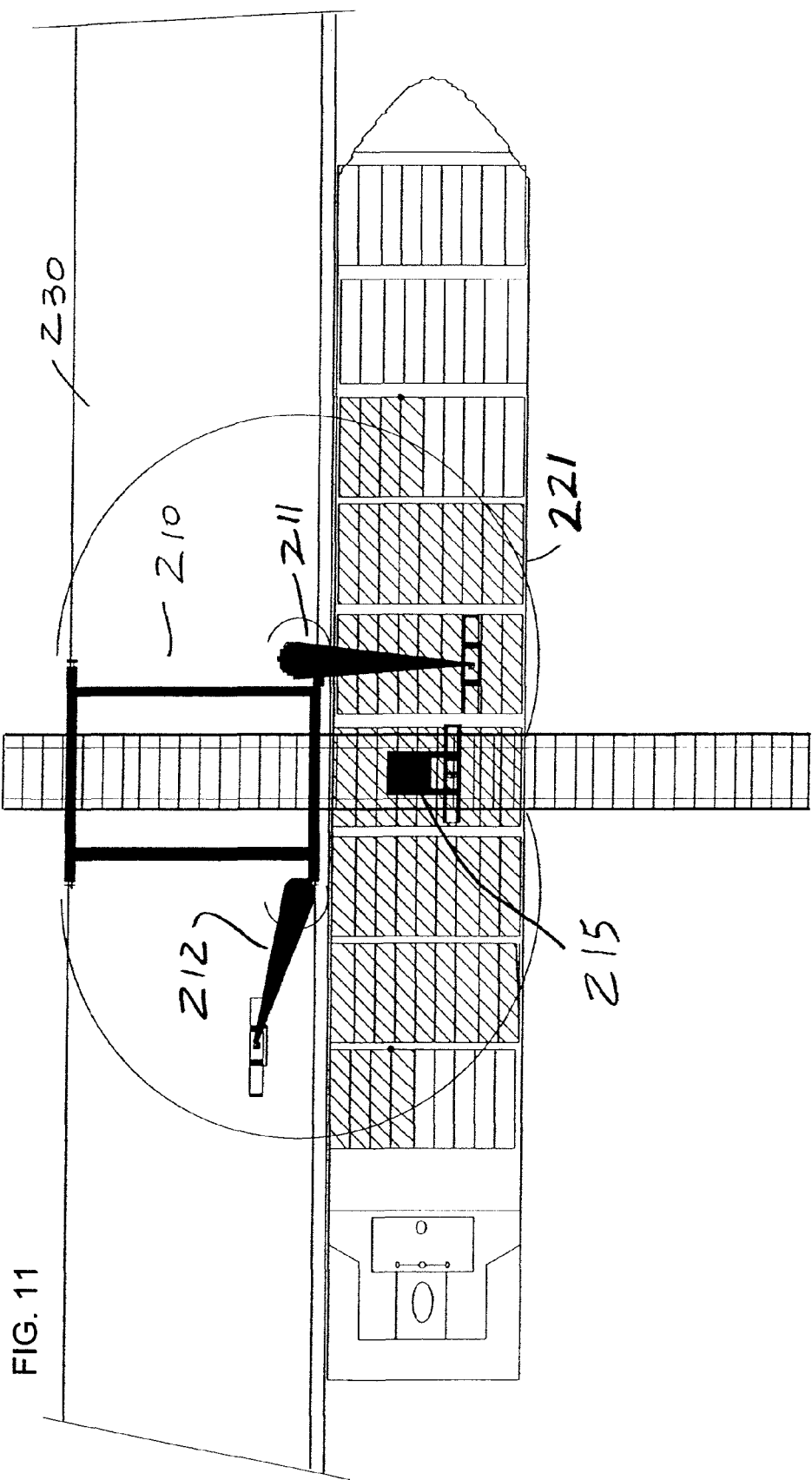
FIG. 11 is a plan view showing a gantry of the present invention with two attached boom cranes.

In some terminals, one might use gantries similar to gantries 510 and 410, but without back boom cranes (see gantry 210 in FIG. 11, showing two ship side boom cranes 211 and 212). In such a terminal, cargo transferred between vessel 221 and dock 230 might be handled with terminal tractors (not shown). Other vehicles such as AGV's (automated guided vehicles) and over-the-road approved trucks and trailer chassis can be used depending upon the terminal operations.

FIG. 11 shows a 9-container wide ship 221 with one gantry 210 configured with two ship-side boom cranes 211 and 212. Gantry 210 with two attached pedestal cranes 211 and 212 working a 9-container wide ship 221 gives simultaneous access to 53 cells versus a standard gantry's access of only 9 cells. Two standard gantries working as close as possible to each other cannot access the ship's bay between them without both cranes gantrying to new positions. The improved gantry 210 with two boom cranes 211 and 212 reaches seven adjacent bays without moving the gantry. A small terminal using the improved gantry 210 can handle ships efficiently and allow a more flexible ship stowage plan.

In FIG. 11, the hatched area shows a reach into 53 cells on a 9-wide ship 221 using a 100' (30.5 m) boom reach.

Gantry cranes similar to gantry cranes 510 and 410 might be used on a platform or finger pier handling cargo between ships (or larger barges) and feeder vessels or barges. In this example the terminal operates as a transfer hub for water born vessels, and the gantry cranes might each have a single ship side boom crane and two back boom cranes (the ship side boom cranes could be positioned distant from one another on the gantries).

Gantry cranes 510 and 410 might be used to transfer cargo between a dock and a container vessel along the dock In such a situation, gantry cranes 510 and 410 would work between a ship or barge and the storage stack, trucks and trains.

One or more of the boom cranes attached to the gantry cranes of the present invention can be horizontal slewing boom cranes (not shown in the drawings).

The examples mentioned herein show some of the benefits that can be achieved by combining a gantry with a boom crane. The examples do not show all of the possible applications. Some of the other possible benefits are for terminals that specialize in mixed cargo including containers, bulk and break bulk cargoes in bags, pallets, coils etc.

FIGS. 12-17 show an embodiment of the present invention, a boom crane and frame to be attached to a new or existing ship to shore gantry. This embodiment of the present invention allows the attachment of a boom crane to a new or existing gantry without substantially increasing wheel loads of the existing gantry. The boom cranes' stability benefits from the attachment. The invention shown in FIGS. 12-17 will allow the addition of one or two boom cranes to an existing gantry without significant structural change to the existing gantry and rail system. A conventional ship-to-shore gantry with one or more attached boom cranes increases cargo productivity economically and improves the efficiency of moving both containerized and non-containerized cargoes between vessels and land side truck/rail-on-dock transport at terminals. The invention improves the transfer of containers or other cargo between ships and feeder vessels or barges.

Figure 12:
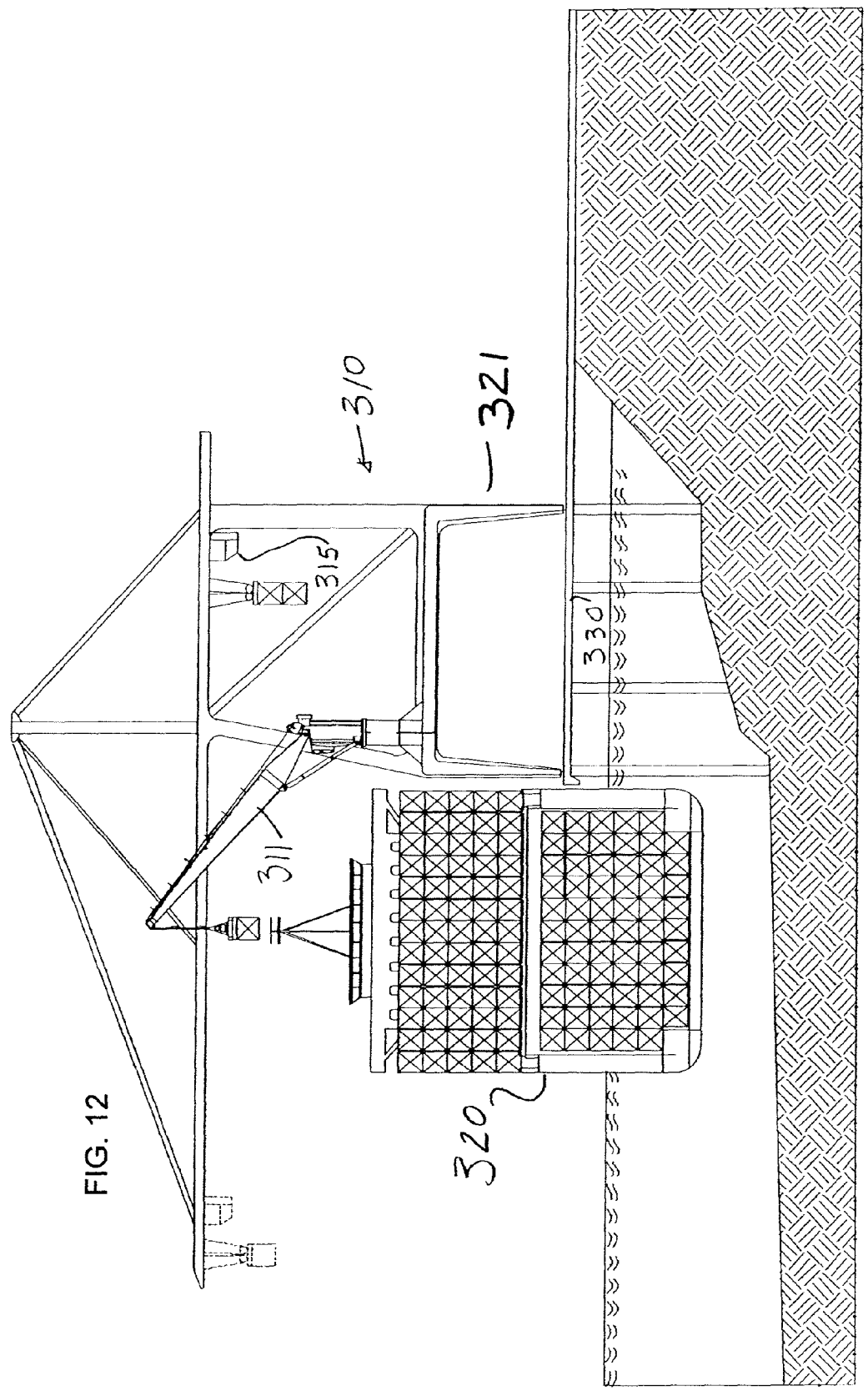
FIG. 12 is a side elevational view showing another embodiment of the present invention, a boom crane and frame attached to a new or existing ship-to-shore gantry.
Figure 13:
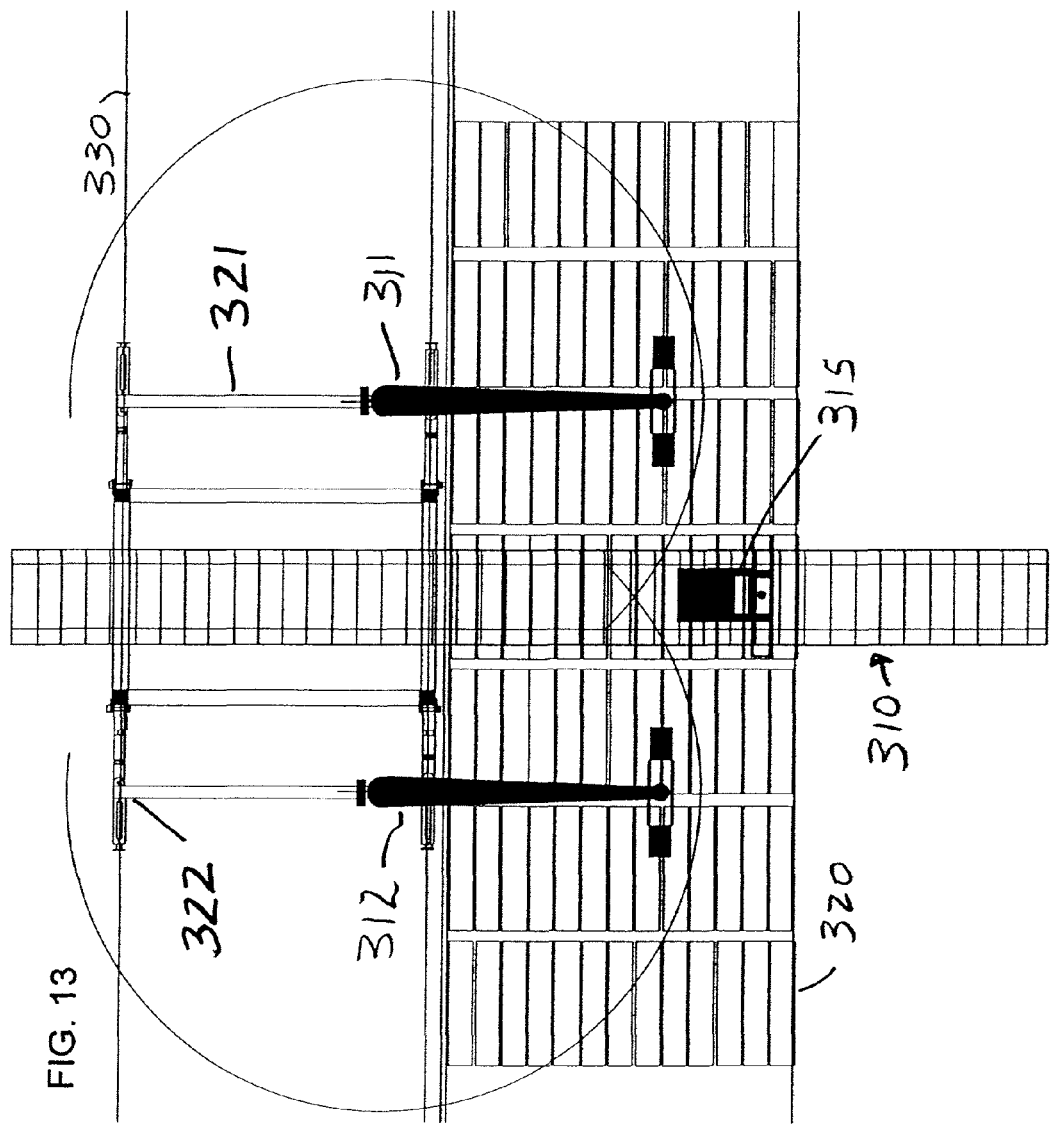
FIG. 13 is a plan view showing the gantry and boom cranes of FIG. 12.

FIGS. 12 and 13 show a conventional ship-to-shore gantry 310 with two pedestal-type boom cranes 311 and 312 on separate frames 321 and 322 attached to the main gantry 310. Other boom cranes such as harbor cranes, jib cranes, telescopic and any other crane with a boom can be attached. The crane frames 321 and 322 can be (and preferably are) built to match the main gantry rail gauge and portal beam clearance. The wheels 343 (see FIGS. 14 and 15) of the boom crane frames 321 and 322 can be freewheeling. Hoist, luffing and sluing power for the attached cranes 311 and 312 can be provided in several ways. The main gantry power supply can be sized to provide the additional power needed for the attached cranes 311 and 312. The attached cranes 311 and 312 may also have a built in diesel/electric or diesel/hydraulic power system located over the back wheels of the crane frames 321 and 322. A separate cable reel or other power conveyance method can be used for the attached cranes 311 and 312 when power is supplied from a utility or a generating plant in the port area. A container ship 320 is shown in FIGS. 12 and 13. A trolley 315 is best seen in FIG. 12.

Figure 14:
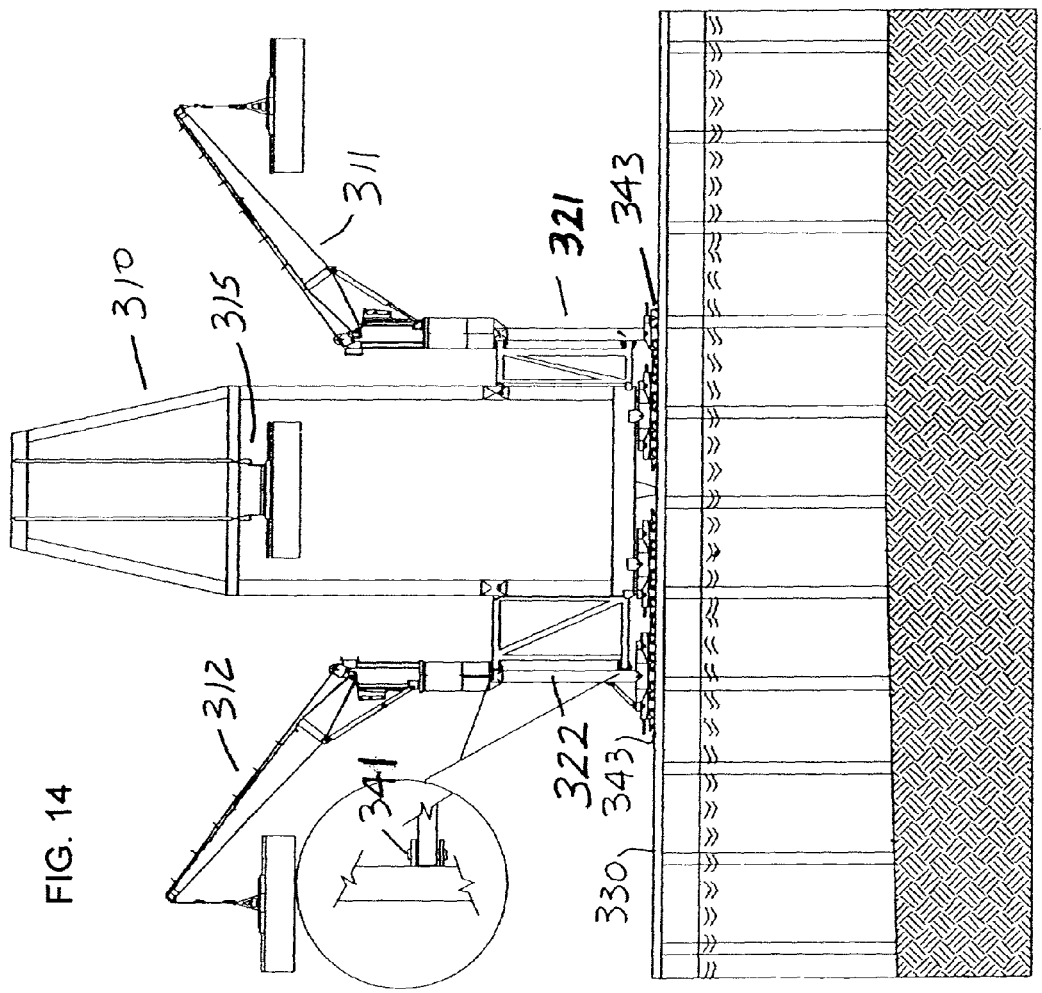
FIG. 14 is a front elevational view showing the gantry and boom cranes of FIG. 12.
Figure 15:
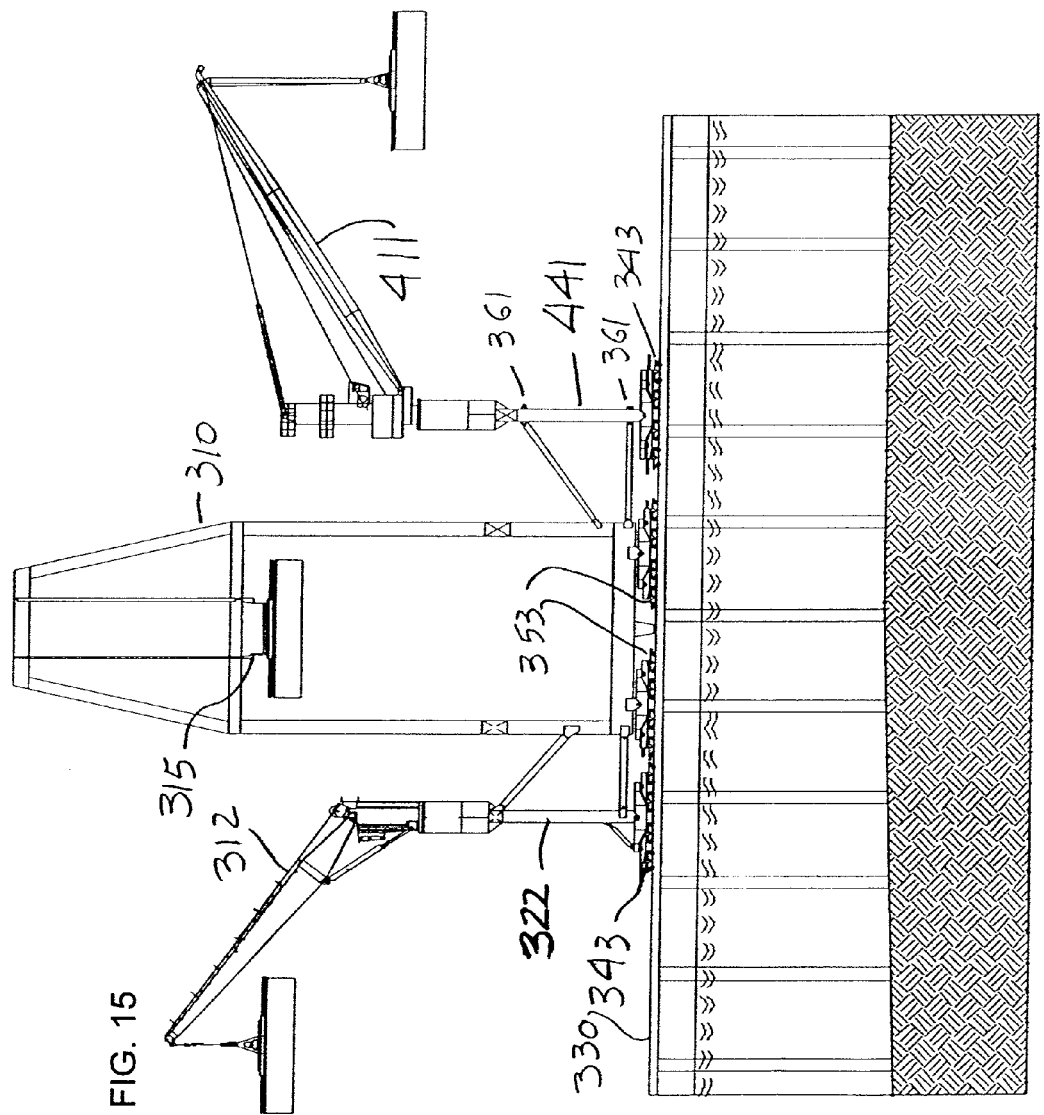
FIG. 15 is a view similar to FIG. 14, but showing an embodiment of the invention including a rope luffing jib crane.

FIGS. 14 and 15 show different methods used to attach the crane frames 321, 322 to the main gantry 310. The attachment points can be built on both sides of the frame 321, 322 (FIG. 15) and on the main gantry 310 thereby allowing a crane to be moved and attached to either side of a gantry 310. The design will be engineered to distribute the attached crane weight to the separate crane frame wheels 343 without adding significant weight to the main gantry wheels 353. The number of wheels for the crane frame 321, 322 can be designed to keep the wheel weights within the rail design limits of the facility. The attachment points on the main gantry 310 are located to provide crane stability in the "East/West" direction along the dock 330. The "North/South" crane stability results from the separate crane frame. A structural analysis of the existing gantry and the dynamic forces of the operations will determine the best points for the attachment.

FIG. 14 shows the preferred location of slip pins 344 and fixed pins and a detail of a slip pin.

The braces should be engineered to be as high as possible for crane stability. In FIG. 15, attachment points 361 are provided on frame 441 for opposite side installation. In FIG. 15, a rope luffing jib crane 411 replaces the hydraulic ram luffing crane 311 of FIGS. 12-14. Also, the separation of frame 441 from gantry 310 is greater than the separation of frame 322 from gantry 310 to give added stability and reach to crane 411.

Figure 16:
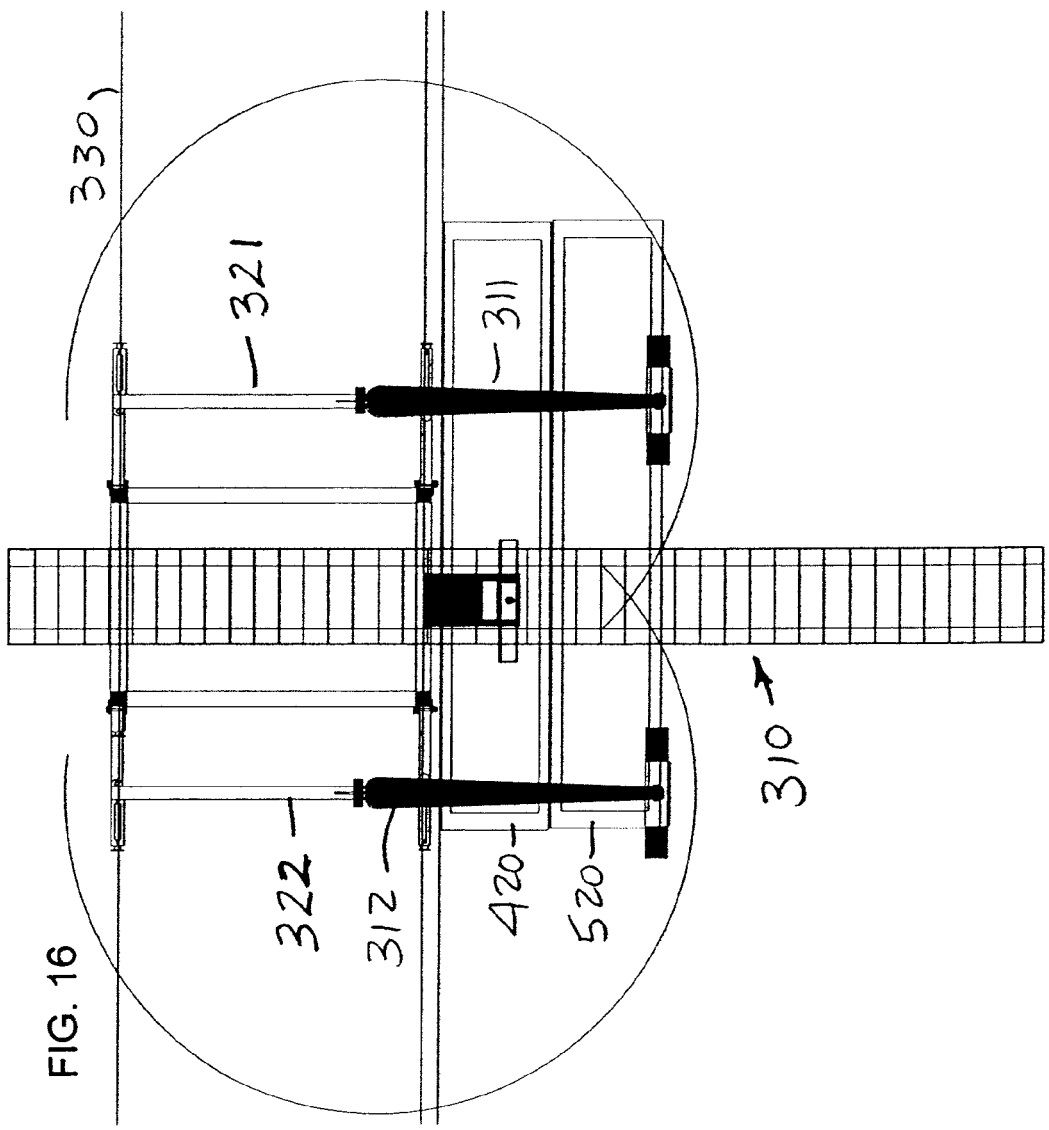
FIG. 16 is a plan view showing the gantry and boom cranes of FIG. 12 adjacent barges.
Figure 17:
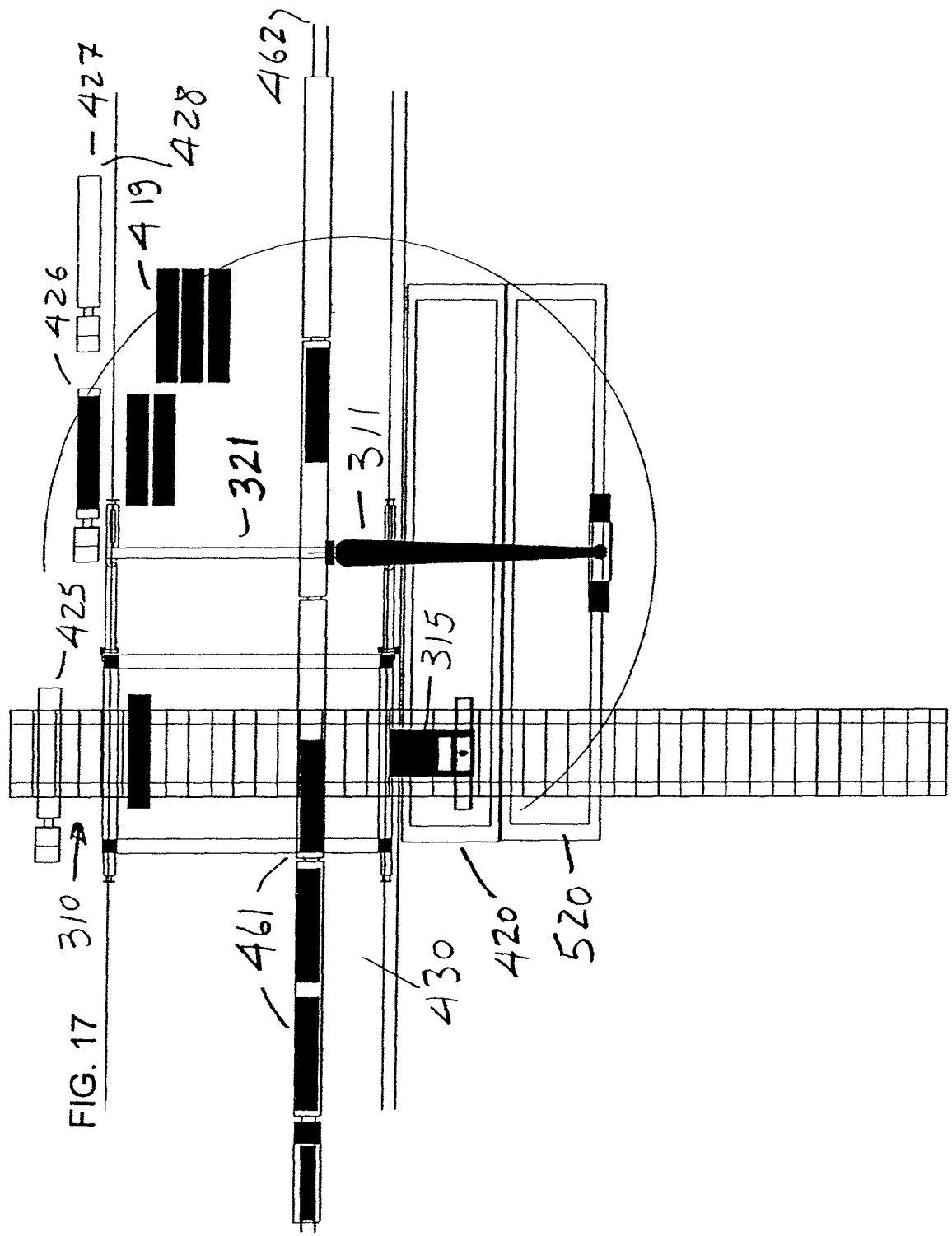
FIG. 17 is a plan view showing the gantry of FIG. 12 adjacent barges, but with a single attached boom crane.

FIGS. 16 and 17 show the modified gantry 310 positioned over two standard hopper barges 420, 520. For barge and similar operations where the vessel(s) being loaded are without ballast and trim pumps, the modified gantries 310 are substantially more productive because the barge trim can be maintained during operations without gantrying up and down the length of the barge. Hopper barges 420, 520 can be 35 feet (10.7 m) wide and 195 feet (59.4 m) long, for example.

FIG. 17 shows a rail-on-dock operation 430. The boom crane 311 provides better reach to temporary stacks, trucks and train. The improved reach gives a terminal operator added flexibility to plan rail-on-dock operations efficiently.

In FIG. 17, a temporary storage stack 419 is indicated below the truck lanes 428. Three trucks 424, 426, and 427 are on the truck lanes 428. Railroad cars 461 or other like container-carrying means are on track 462.

The present invention has particular utility in the systems and methods disclosed in International Publication No. WO 01/42125 A1, which is incorporated herein by reference.

Figure 18:
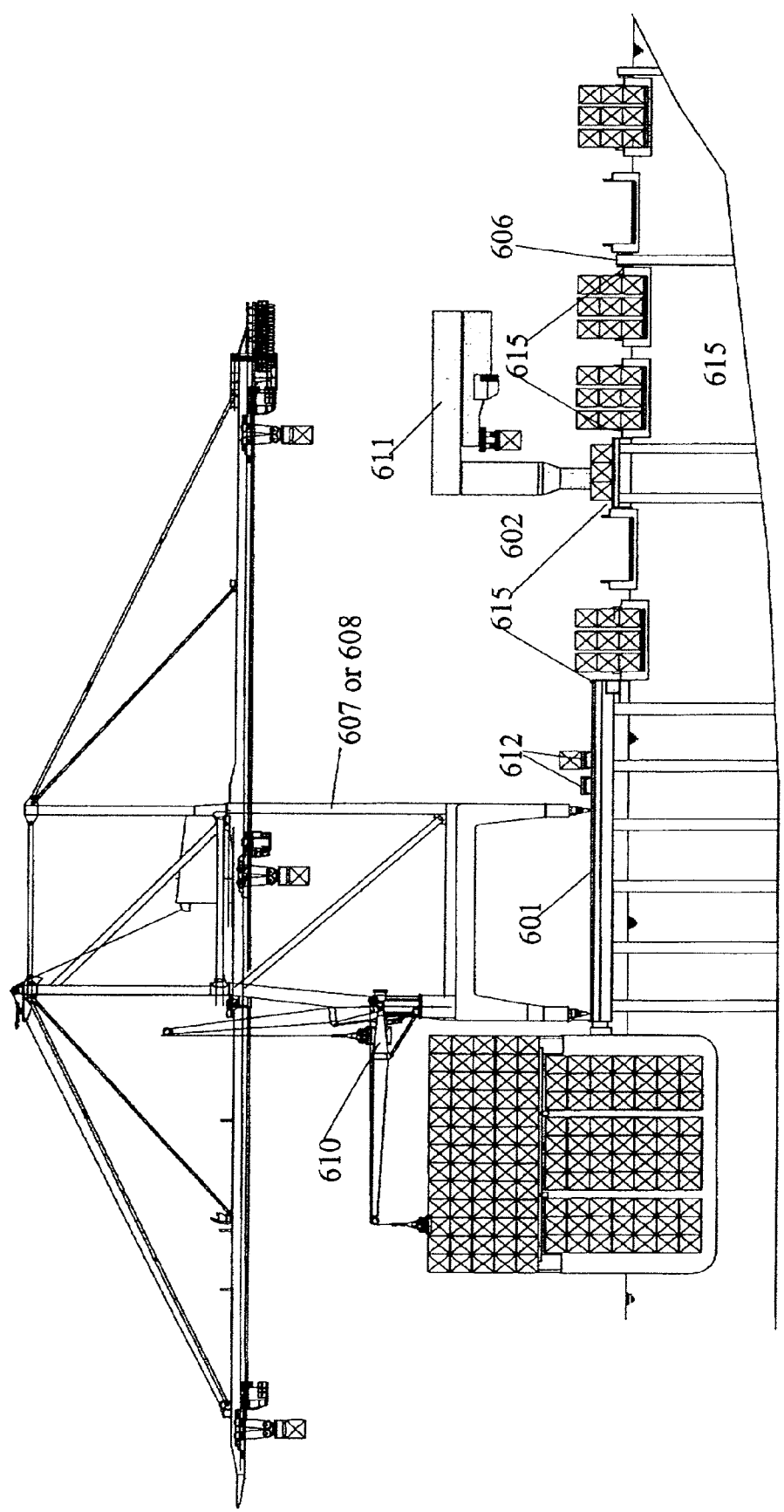
FIG. 18 is a plan view of another embodiment of the present invention.
Figure 19:
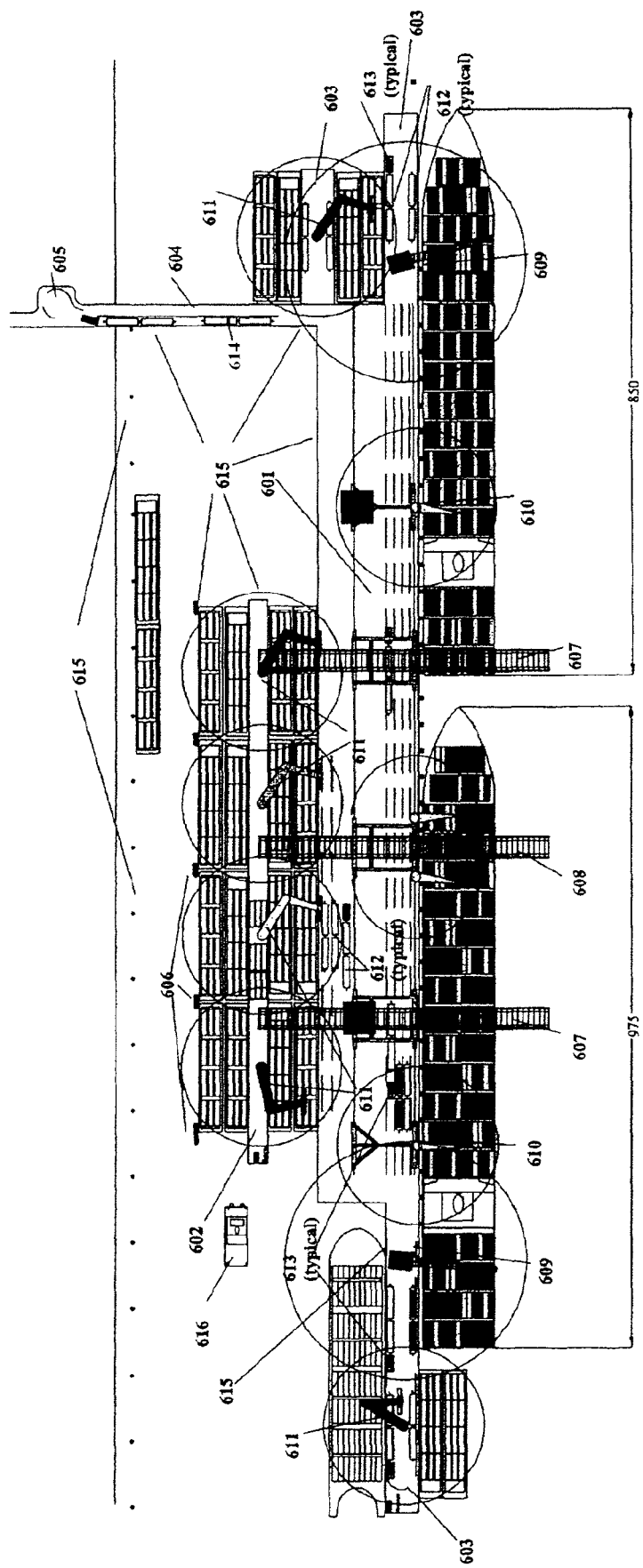
FIG. 19 is an elevation of the embodiment of the present invention shown in FIG. 18.

FIGS. 18 and 19 show Sea Point System Components of another embodiment of the present invention.

Platform
    Deck 601
    MPC (multi-purpose container) Island 602
    Deck Extensions 603
    Causeway 604
    Causeway truck turn-around 605
    Mooring Dolphins 606
Lift Equipment
    Over the Ocean vessel
    Gantry crane(s) with trolley's and hatch storage 607
    Sea Point gantry crane(s) (trolley gantry cranes with one or two "boom" cranes attached and hatch storage 608
    Harbor crane(s) fixed or mobile 609. The harbor cranes operate over the ship or barges.
    CBW type "boom" crane(s) mounted on separate gantry frames with hatch storage 610.
    Over the Barges
    MPC cranes with horizontal slewing booms. 611
    Harbor cranes fixed or mobile 609
Horizontal Conveyance Equipment
    Bi-directional draw bar multi-trailers 612 and yard tractors 613 with automatic hitches.
Miscellaneous
    Container scanning equipment 614
    Fixed Barge shift equipment (winches and sliders) 615
    Push boats 616
Facility Operating System
    Software
    Control and monitoring hardware The use of a bi-directional drawbar double trailer (multi-trailer) 612 with an automatic hitch improves the present invention's operating flexibility, reduces labor, reduces vehicle traffic and supports cargo operations at the platform extension 603.

The bi-directional trailer allows a tractor 613 to pull into a narrow platform extension (about 50' wide) 603. The truck without trailer can then make a U-turn and the trailer can be pulled out from the other drawbar on the opposite end. This system can be used in several areas of the platform to create additional barge docking locations where the barges can be shifted independently of the other barges. As seen in FIG. 19, a single MPC barge crane 611 on a 50' wide platform extension 603 can reach four barges and at least two trailers. As can be seen in FIGS. 18 and 19, multi-purpose container cranes 611 have an upper horizontal slewing boom and a lower horizontal slewing boom holding the container spreader below the upper horizontal slewing boom. The ability to rapidly shift strings or sets of barges independently of each other without interrupting the MPC cranes' cargo operations of the remaining barges is essential to service the largest ship loads without slowing the facility's productivity.

A separate MPC platform island 602 and mooring points 606 for the outer lane of barges gives each MPC 611 crane the ability to reach every cell in four barges and two trailer lanes on the main platform 601. The barges in each of the four lanes can be shifted without interrupting the cargo operations to the three remaining barge lanes.

The "Next Best Pick" (NBP) system of the present invention is a method of selecting containers from a ship in the optimal order for direct placement into the barges. This is in contrast to the typical prior art method of sequential selection that does not allow efficient sorting or resource leveling. The NBP method joined with the extraordinary access and selection of a Sea Point™ gantry produces a system capable of sorting cargo by train destination while rapidly unloading large container ships. The NBP and the gantry crane keep a balanced flow of containers to the six MPC cranes. The speed and efficient load path allow the six MPC cranes to work platform storage and barge lifts without slowing the ship lifts. The gantry can access multiple (e.g. 49) cells without moving. Platform intermediate storage can provide detailed sorting for containers that are destined for direct discharge to rail-on-dock facilities.

Facility Operating System (FOS) Sea Point™ must sort import containers into the correct destination barge while maintaining the barge trim and balance. In addition, the barges destined for direct discharge to a wharf with a rail on dock facility must have containers sorted by train destination. This sorting within a barge must allow the discharge of the barge at destination directly into the destination blocks of railcars. Container dimensions, weight, type, hazardous cargo, oversize and reefer containers must also be evaluated during the sorting into the individual barges. A number of containers can be put to a temporary stack within reach of the MPC crane to facilitate the train destination block sorting.

The FOS system controls the sort and optimizes the platform resources by directing the cranes to the "Next Best Pick" (NBP) from the ship and barge cargo. NBP describes a method of selecting containers in the optimal order for direct placement into the barges or ship. The NBP operating concept is fundamentally different from that used at most terminals. In most terminals the container unloading sequence is a fixed predetermined sequence. The Sea Point™ FOS directs the cranes to the NBP based on the sorting requirements and available platform resources. The Sea Point™ FOS is a dynamic system that continuously measures actual conditions such as equipment slow downs, breakdowns or resource overloads that are creating temporary system bottlenecks and directs the equipment to optimize operations by adjusting the NBP.

The crane automation for Sea Point™ includes automation of the "macro" or horizontal portion of the crane moves. The crane operator maintains "dead man" control during the automatic move. Final positioning, hoisting and lowering are manual operations controlled entirely by the crane operator.

The FOS direction to the proper container for the NBP calls up the expected box particulars from the ship or barge manifest and displays the anticipated ISO number on the crane operator's screen. The load data from the crane system automatically updates the barge trim and stability calculation with the proven box weight. Once the box is hoisted into view, the operator verifies the ISO number is as expected by touching "OK" on his screen.

The FOS includes a vessel management system for the barges and ocean going vessels.

PARTS LIST

The following is a list of parts suitable for use in the present invention:
10 platform apparatus of a first embodiment of the present invention
11 ship side boom cranes
12 ship side boom cranes
13 transfer area
14 transfer area
15 trolley
16 transfer rack
17 back boom crane
18 back boom crane
19 container storage stack
20 platform structure of platform apparatus 10 and 100
21 jack-up module
22 jack-up module
23 jack-up module
24 spud legs
30 dock
31 ocean-going vessel
32 ocean-going vessel
41 barge going to port C
42 barge going to port A
43 barge going to port B
44 barge going to port A
45 barge going to port D
51 container handling crane
52 container handling crane
53 container handling crane
54 container handling crane
55 loaded containers
56 crane legs
57 bracing
58 gantries
59 trolley stops
61 transfer cars
62 road ways
65 transfer rack of platform apparatus 100
66 openings adjacent rack 65
71 cabs and traveling trolleys
75 helicopter pad (heliport)
76 yard tractor
80 water
81 water line
90 mud
91 mud line
100 platform apparatus of the second embodiment of the present invention
110 platform apparatus of the third embodiment of the present invention
112 ship side boom crane
115 trolley
116 transfer rack
117 back boom crane
118 back boom crane
120 platform
124 piles for platform 120
141 boom crane with lifting hoist
142 boom crane with lifting hoist
143 pedestal type boom crane with lifting hoist
144 pedestal type boom crane with lifting hoist
145 pedestal type boom crane with lifting hoist
146 pedestal type boom crane with lifting hoist
151 container handling crane
152 container handling crane
153 gantry of crane 151
154 gantry of crane 152
200 platform apparatus of the fourth embodiment of the present invention
210 gantry
211 ship side boom crane
212 ship side boom crane
221 vessel
220 platform
225 causeway from platform 220 to shore
230 dock
231 mobile harbor crane
232 mobile harbor crane 233 mobile harbor crane
234 mobile harbor crane
241 boom crane with lifting hoist
242 boom crane with lifting hoist
243 telescopic boom crane with lifting hoist
244 telescopic boom crane with lifting hoist
245 telescopic boom crane with lifting hoist
246 telescopic boom crane with lifting hoist
251 container handling crane
252 container handling crane
253 gantry of crane 251
254 gantry of crane 252
310 conventional ship-to-shore gantry
311 pedestal-type boom crane
312 pedestal-type boom crane
315 trolley
320 container ship
321 frame
322 frame
330 dock
341 slip pins
342 feeder vessel
343 wheels
344 feeder vessel
345 barge
346 barge
353 main gantry wheels
361 attachment points
410 gantry crane
411 rope luffing jib crane
419 temporary storage stack
420 standard hopper barges
424 truck
426 truck
427 truck
428 truck lanes
430 rail-on-dock operation
441 frame
461 railroad cars
462 track
510 gantry crane
520 standard hopper barges
601 deck
602 MPC island
603 deck extensions
604 causeway
605 causeway truck turn-around
606 mooring dolphins
607 gantry crane with trolleys and hatch storage
608 Sea Point gantry crane (trolley gantry cranes with one or two "boom" cranes attached and hatch storage)
609 Harbor crane, fixed or mobile
610 CBW type "boom" crane mounted on separate gantry frames with hatch storage
611 MPC cranes with horizontal slewing booms
612 bi-directional draw bar multi-trailers
613 yard tractors with automatic hitches
614 container scanning equipment
615 fixed barge shift equipment (winches and sliders)
616 push boats
720 container vessel In all plan views, the circles and partial circles show the maximum outreach of the boom crane whose base is at the center of the partial circle.

Figure 2:
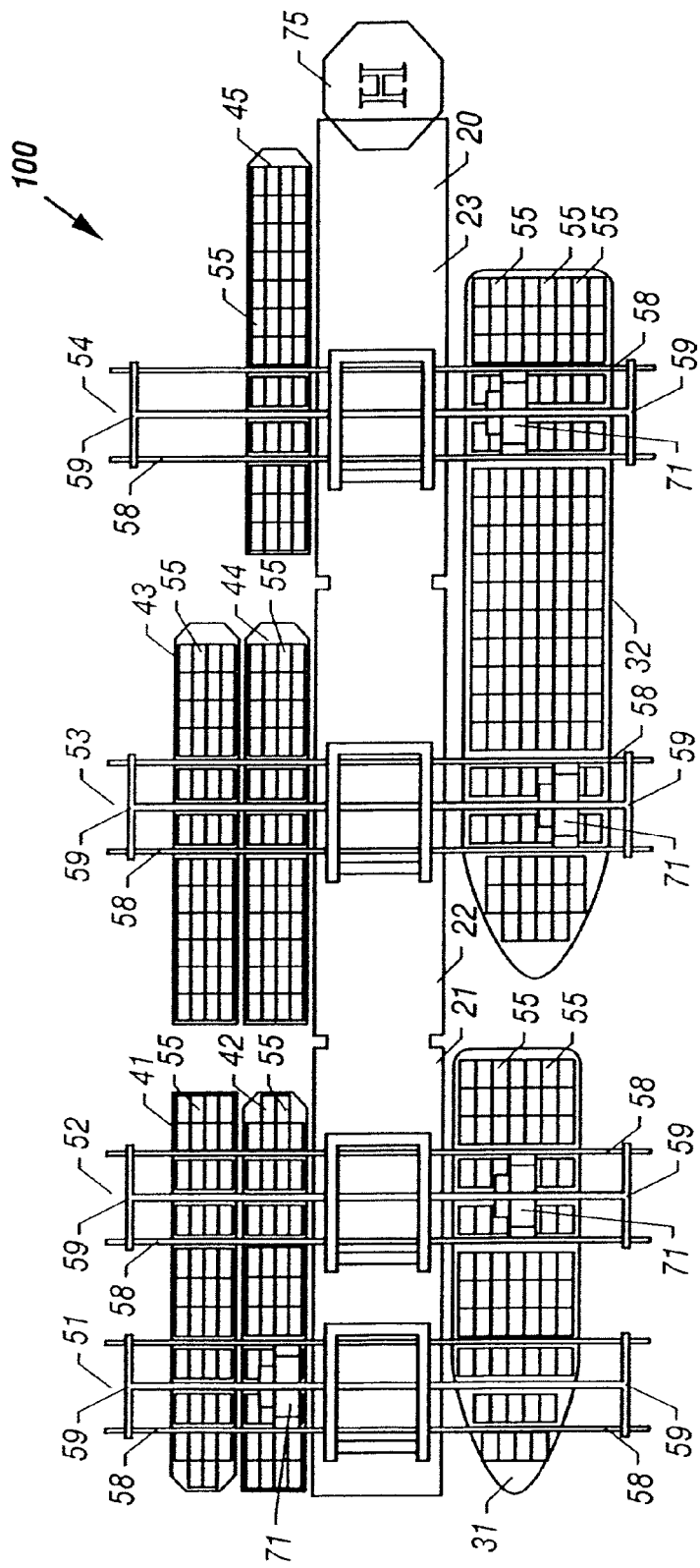
FIG. 2 is a top view of the first embodiment of the apparatus of the present invention.

Various features have been shown in various figures herein. Feature appearing in one figure can be used with apparatus in other figures. For example, though jack-up legs are shown in FIGS. 1 and 3, and pilings are shown in FIGS. 5 and 7, the platform in FIGS. 1 and 3 can be supported by pilings and the platform in FIGS. 5 and 7 can be supported by jack-up legs. Likewise, cranes appearing in one figure can be used with the apparatus shown in other figures. Also, various features shown in the various patents cited herein can be incorporated into the apparatus of the present invention.

More information about the invention can be found in the papers attached to U.S. Provisional Patent Application No. 60/394,988, filed 10 Jul. 2002.

Any suitable materials, such as steel, can be used to construct the apparatus of the present invention. For example, reinforced concrete can be used for the platform deck.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of transferring containers from a ship to barges positioned nearby, comprising:
   providing a gantry crane on a platform;
   providing a plurality of cranes on a multi-purpose container platform island near the platform;
   positioning the ship near the platform and the island;
   positioning the barges near the platform and the island;
   selecting containers from the ship in the optimal order for direct placement into the barges positioned nearby; and
   using the cranes to move the containers from the ships to the barges.

2. The method of claim 1, wherein the order of the containers is selected using a dynamic system that continuously measures actual conditions such as equipment slow downs, breakdowns or resource overloads that are creating temporary system bottlenecks and directs the equipment to optimize operations by adjusting the next best pick for the container to be selected.

3. The method of claim 2, wherein the dynamic system evaluates container dimensions, weight, type, hazardous cargo, oversize and reefer containers during the sorting into the individual barges.

4. The method of claim 2, wherein the dynamic system sorts containers into the correct destination barge while maintaining the barge trim and balance.

5. The method of claim 2, wherein the dynamic system sorts containers by train destination for placement in barges destined for direct discharge to a wharf with a rail on dock facility.

6. The method of claim 5, wherein the dynamic system puts a number of containers in a temporary stack within reach of a crane to facilitate train destination block sorting.

7. The method of claim 5, further comprising moving containers using a multi-purpose container crane having with an upper horizontal slewing boom and a lower horizontal slewing boom holding the container spreader below the upper horizontal slewing boom.

* * * * *